United States Patent
Park et al.

(10) Patent No.: US 11,811,570 B2
(45) Date of Patent: Nov. 7, 2023

(54) METHODS AND APPARATUS FOR SOUNDING REFERENCE SIGNALS FOR POSITIONING

(71) Applicant: QUALCOMM Incorporated, San Diego, CA (US)

(72) Inventors: Seyong Park, San Diego, CA (US); Alexandros Manolakos, Escondido, CA (US); Weimin Duan, San Diego, CA (US); Jay Kumar Sundararajan, San Diego, CA (US); Wanshi Chen, San Diego, CA (US); Krishna Kiran Mukkavilli, San Diego, CA (US); Tingfang Ji, San Diego, CA (US); Naga Bhushan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 282 days.

(21) Appl. No.: 17/404,884

(22) Filed: Aug. 17, 2021

(65) Prior Publication Data
US 2022/0060359 A1    Feb. 24, 2022

Related U.S. Application Data

(60) Provisional application No. 63/067,841, filed on Aug. 19, 2020, provisional application No. 63/068,948, filed on Aug. 21, 2020.

(51) Int. Cl.
*H04L 27/26* (2006.01)
*H04L 5/00* (2006.01)

(52) U.S. Cl.
CPC ........ *H04L 27/2607* (2013.01); *H04L 5/0051* (2013.01); *H04L 27/2613* (2013.01)

(58) Field of Classification Search
CPC ........... H04L 27/26035; H04L 27/2607; H04L 27/2613; H04L 27/2634; H04L 5/0016; H04L 5/0048; H04L 5/0051; H04W 64/00
See application file for complete search history.

(56) References Cited

U.S. PATENT DOCUMENTS

2017/0366377 A1* 12/2017 Papasakellariou .... H04L 1/0026
2020/0313932 A1* 10/2020 Sun ........................ H04L 5/0051

OTHER PUBLICATIONS

Xiaolin et al. ("Investigation on Multi-Cell Sounding Reference Signal Coordination for TD-LTE-Advanced CoMP" 2006 IEEE 63rd Vehicular Technology Conference, IEEE, Jun. 2, 2013 (Year: 2013).*

(Continued)

*Primary Examiner* — Melvin C Marcelo
*Assistant Examiner* — Natali Pascual Peguero
(74) *Attorney, Agent, or Firm* — Procopio, Cory, Hargreaves & Savitch LLP

(57) ABSTRACT

Sounding reference signals (SRS) transmitted by a UE, e.g., for positioning or channel estimation, may be configured for one or both of frequency tone level cyclic shift and symbol level code, which, for example, enables multiplexing a greater number of UEs. The frequency tone level cyclic shift is produced by jointly processing a number of symbols with an extended cyclic shift structure. The SRS may be configured using a symbol group level that indicates the number of symbols associated with a cyclic shift structure, and an outer code that indicates a multiplier applied to the SRS at the symbol level, which increases the multiplexing opportunities. The symbol level code may further indicate an extended cyclic shift indicating a linear increase in phase rotation across tones in symbols associated with the symbol group level.

30 Claims, 15 Drawing Sheets

(56) References Cited

OTHER PUBLICATIONS

Fraunhofer Iis, et al., "SRS Enhancements for NR Positioning", 3GPP Draft, 3GPP TSG RAN WG1 Meeting #96, R1-1905484_SRS Enhancements for NR Positioning, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 2, 2019 (Apr. 2, 2019), XP051707552, 14 Pages, Retrieved from the Internet: URL: http://www.3gpp.org/ftp/tsg%5Fran/WG1%5FRL1/TSGR1%5F96b/Docs/R1%2D1905484%2Ezip [retrieved on Apr. 2, 2019] Sections 2.2 and 2.3, Figures 4-5, Figure 2 Section 2.1.
Hou, X, et al., "Investigation on Multi-Cell Sounding Reference Signal Coordination for TD-LTE—Advanced CaMP", 2006 IEEE 63rd Vehicular Technology Conference, IEEE, Jun. 2, 2013 (Jun. 2, 2013), XP032547770, pp. 1-5, ISSN: 1550-2252, DOI: 10.1109/VTCSPRING.2013.6692606 [retrieved on Dec. 22, 2013], Section II., and III.B.
International Search Report and Written Opinion—PCT/US2021/046448—ISA/EPO—dated Dec. 9, 2021.
Qualcomm Incorporated: "Additional SRS Symbols", 3GPP Draft, 3GPP TSG-RAN WG1 #96bis, R1-1904532_SRS Additional Symbols, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019 Apr. 7, 2019 (Apr. 7, 2019), XP051699762, pp. 1-9, Retrieved from the Internet: URL:http://www.3gpp.org/ftp/Meetings%5F3GPP%5FSYNC/RAN1/Docs/R1%2D1904532%2Ezip [retrieved on Apr. 7, 2019] paragraphs [0001] [0002] [0004] [0005] [0006] [0007] [0008], Section 4 Figure 2.

* cited by examiner

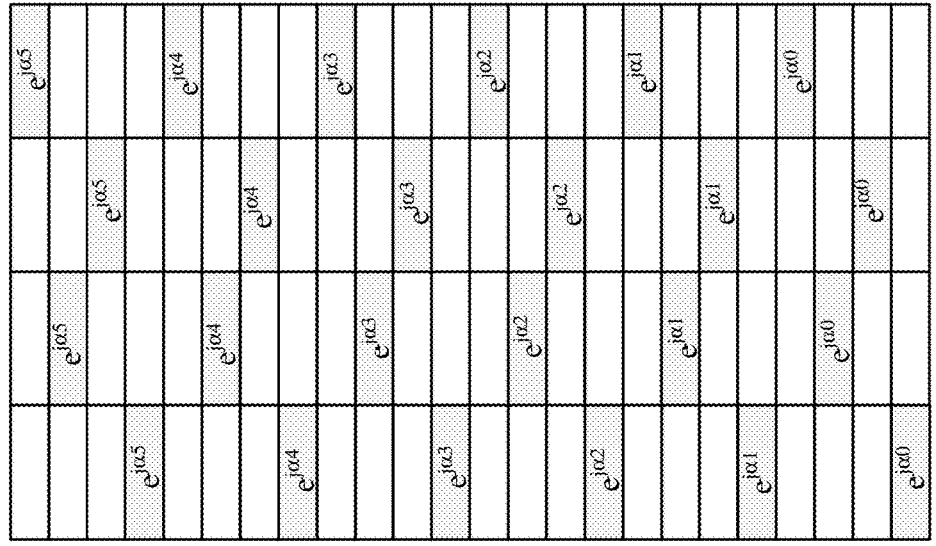
FIG. 5
(Conventional)
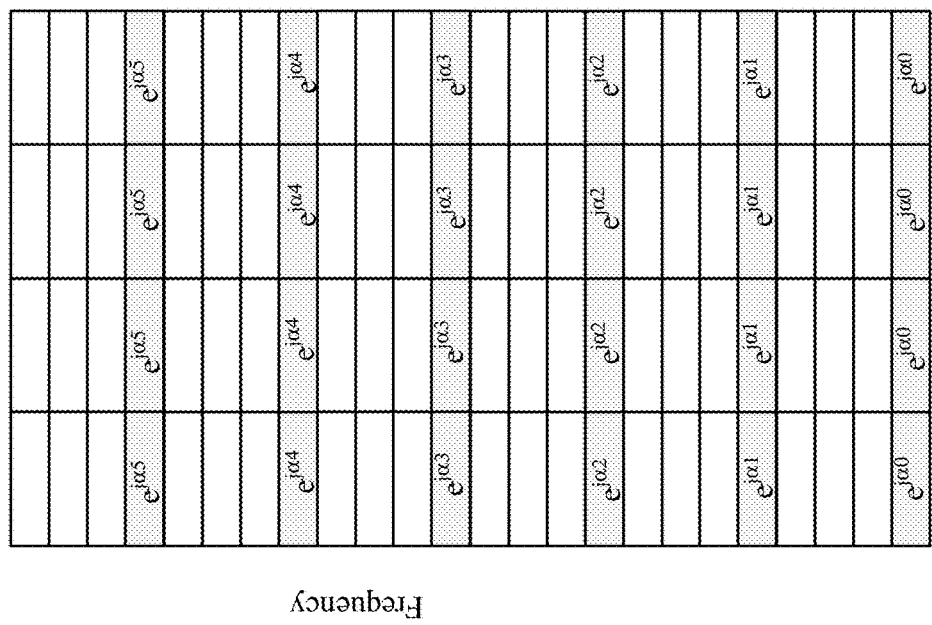
FIG. 6
(Conventional)

METHODS AND APPARATUS FOR SOUNDING REFERENCE SIGNALS FOR POSITIONING

CLAIM OF PRIORITY UNDER 35 U.S.C. § 119

This application claims under 35 USC § 119 the benefit of and priority to U.S. Provisional Application No. 63/067,841, filed Aug. 19, 2020, and entitled "METHODS AND APPARATUS FOR SOUNDING REFERENCE SIGNALS FOR POSITIONING," and to U.S. Provisional Application No. 63/068,948, filed Aug. 21, 2020, and entitled "METHODS AND APPARATUS FOR SOUNDING REFERENCE SIGNALS FOR POSITIONING," both of which are assigned to the assignee hereof and are incorporated herein by reference in their entireties.

BACKGROUND

Field

Subject matter disclosed herein relates to sounding reference signals (SRS) transmitted by a mobile device and more particularly to the configuration of the SRS.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit a positioning reference signal (PRS) that may be received and measured by the mobile device. For example, a UE may generate positioning measurements from the downlink (DL) PRS such as Reference Signal Time Difference (RSTD), Reference Signal Received Power (RSRP), and reception and transmission (Rx-Tx) time difference measurements, which may be used in downlink positioning methods, such as DL-Time Difference of Arrival (TDOA), DL-Angle of Departure (AoD). Similarly, a mobile device may transmit reference signals, for example, sounding reference signals (SRS), that are received and measured by base stations. A base station may generate positioning measurements from the uplink (UL) SRS such as RSTD and Rx-Tx, which may be used in uplink positioning methods, such as UL-TDOA, UL-AoA. Additionally, combined measurements using PRS and SRS, such as Rx-Tx, may be used for combined DL and UL based positioning included, e.g., round-trip time (RTT), which may be with one or more neighboring base stations (multi-RTT).

The mobile device is provided with SRS configuration information to generate the SRS, and the base station(s) use the configuration information to process the SRS received from the mobile device. It may be desirable to multiplex multiple mobile device when using SRS for positioning. Accordingly, improvements to the configuration of SRS may be desirable.

SUMMARY

Sounding reference signals (SRS) transmitted by a UE, e.g., for positioning or channel estimation, may be configured for one or both of frequency tone level cyclic shift and symbol level code, which, for example, enables multiplexing a greater number of UEs. The frequency tone level cyclic shift is produced by jointly processing a number of symbols with an extended cyclic shift structure. The SRS may be configured using a symbol group level that indicates the number of symbols associated with a cyclic shift structure, and an outer code that indicates a multiplier applied to the SRS at the symbol level, which increases the multiplexing opportunities. The symbol level code may further indicate an extended cyclic shift indicating a linear increase in phase rotation across tones in symbols associated with the symbol group level.

In one implementation, a method performed by a user equipment (UE) for supporting wireless transmissions by the UE in a wireless network, includes receiving a configuration for sounding reference signals (SRS) from a base station, the configuration for the SRS comprising a symbol group level indicating a number of symbols associated with a cyclic shift structure, and an outer code indicating a multiplier applied to the SRS at a symbol level; preparing the SRS according to the configuration for the SRS comprising the symbol group level and the outer code; and transmitting the SRS to one or more base stations.

In one implementation, a user equipment (UE) configured for supporting wireless transmissions by the UE in a wireless network, includes a wireless transceiver configured to wirelessly communicate with entities in the wireless network; at least one memory; at least one processor coupled to the wireless transceiver and the at least one memory, wherein the at least one processor is configured to: receive, via the wireless transceiver, a configuration for sounding reference signals (SRS) from a base station, the configuration for the SRS comprising a symbol group level indicating a number of symbols associated with a cyclic shift structure, and an outer code indicating a multiplier applied to the SRS at a symbol level; prepare the SRS according to the configuration for the SRS comprising the symbol group level and the outer code; and transmit, via the wireless transceiver, the SRS to one or more base stations.

In one implementation, a user equipment (UE) configured for supporting wireless transmissions by the UE in a wireless network, includes means for receiving a configuration for sounding reference signals (SRS) from a base station, the configuration for the SRS comprising a symbol group level indicating a number of symbols associated with a cyclic shift structure, and an outer code indicating a multiplier applied to the SRS at a symbol level; means for preparing the SRS according to the configuration for the SRS comprising the symbol group level and the outer code; and means for transmitting the SRS to one or more base stations.

In one implementation, a non-transitory computer-readable storage medium including program code stored thereon, the program code is operable to configure at least one processor in a user equipment (UE) configured for supporting wireless transmissions by the UE in a wireless network, the program code comprising instructions to: receive a configuration for sounding reference signals (SRS) from a base station, the configuration for the SRS comprising a symbol group level indicating a number of symbols associated with a cyclic shift structure, and an outer code indicating a multiplier applied to the SRS at a symbol level; prepare the SRS according to the configuration for the SRS comprising the symbol group level and the outer code; and transmit the SRS to one or more base stations.

In one implementation, a method performed by a serving base station for supporting wireless transmissions by a user equipment (UE) in a wireless network, includes sending a configuration for sounding reference signals (SRS) to the UE, the configuration for the SRS comprising a symbol group level indicating a number of symbols associated with a cyclic shift structure, and an outer code indicating a multiplier applied to the SRS at a symbol level; receiving the SRS from the UE; and processing the SRS received from the UE according to the configuration for the SRS comprising the symbol group level and the outer code.

In one implementation, a base station configured for supporting wireless transmissions by a user equipment (UE) in a wireless network, the base station is the serving base station for the UE, includes an external interface configured to wirelessly communicate with entities in the wireless network; at least one memory; at least one processor coupled to the external interface and the at least one memory, wherein the at least one processor is configured to: send, via the external interface, a configuration for sounding reference signals (SRS) to the UE, the configuration for the SRS comprising a symbol group level indicating a number of symbols associated with a cyclic shift structure, and an outer code indicating a multiplier applied to the SRS at a symbol level; receive, via the external interface, the SRS from the UE; and process the SRS received from the UE according to the configuration for the SRS comprising the symbol group level and the outer code.

In one implementation, a serving base station for supporting wireless transmissions by a user equipment (UE) in a wireless network, includes means for sending a configuration for sounding reference signals (SRS) to the UE, the configuration for the SRS comprising a symbol group level indicating a number of symbols associated with a cyclic shift structure, and an outer code indicating a multiplier applied to the SRS at a symbol level; means for receiving the SRS from the UE; and means for processing the SRS received from the UE according to the configuration for the SRS comprising the symbol group level and the outer code.

In one implementation, a non-transitory computer-readable storage medium including program code stored thereon, the program code is operable to configure at least one processor in a serving base station for supporting wireless transmissions by a user equipment (UE) in a wireless network, the program code comprising instructions to: send a configuration for sounding reference signals (SRS) to the UE, the configuration for the SRS comprising a symbol group level indicating a number of symbols associated with a cyclic shift structure, and an outer code indicating a multiplier applied to the SRS at a symbol level; receive the SRS from the UE; and process the SRS received from the UE according to the configuration for the SRS comprising the symbol group level and the outer code.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 5 illustrates an exemplary sequence of a 4 symbol, 4 comb sounding reference signal (SRS) with a conventional unstaggered cyclic shift.

FIG. 6 illustrates an exemplary sequence of a 4 symbol, 4 comb SRS with a conventional staggered cyclic shift.

DETAILED DESCRIPTION

Figure 1:
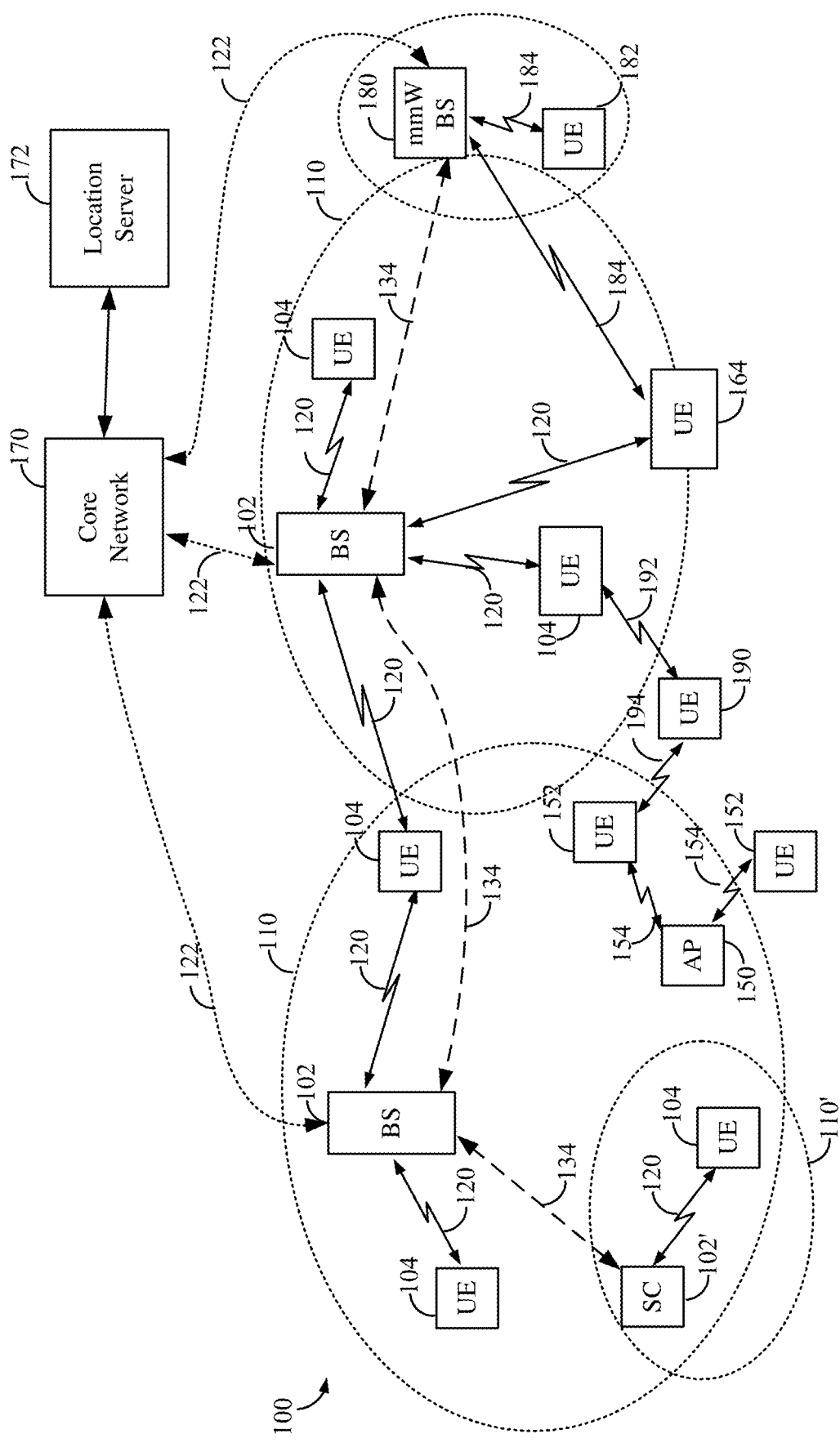
FIG. 1 illustrates an exemplary wireless communications system in which one or both of frequency tone level cyclic shift and symbol level code may be implemented.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical Transmission and Reception Points (TRPs) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE for various positioning techniques, e.g. for the Global Navigation Satellite System (GNSS), Time Difference of Arrival (TDOA), Angle of Departure (AoD), Round Trip Time (RTT) or multi cell RTT (Multi-RTT), and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler). Additionally or alternatively, the UE may be provided with SRS configuration information and instructed to transmit SRS for positioning. One or more base stations may receive and process the transmitted SRS based on the configuration information and perform various positioning measurements of the SRS, which may be provided to a network entity, such as the location server or the UE, for position estimation, e.g., using UL-TDOA or RTT or Multi-RTT.

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AoD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNodeB for LTE access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the NRPPA protocol may be used to transfer such messages between a base station that is a gNodeB and a location server that is an LMF. It is noted that the terms "parameter" and "information element" (IE) are synonymous and are used interchangeably herein.

In addition to positioning, SRS transmitted by the UE may be used for other purposes, such as channel estimation. The requirements for SRS used for channel estimation and SRS used for positioning, are not completely aligned. For example, it is desirable to configure SRS for positioning to multiplex a greater number of UEs. Conventionally, SRS is configured based on bandwidth, the number of symbols, the comb number, and the cyclic shift. The SRS may be configured using a staggered comb pattern to multiplex more UEs, which is acceptable for positioning, as the SRS for positioning does not require the same level of accuracy as SRS for channel estimation.

In some implementations, additional SRS configuration parameters may be implemented to further increase the number of UEs capable of using SRS. In one implementation, the SRS may be configured for frequency tone level cyclic shift, e.g., in which a number of SRS symbols are merged for processing an extended cyclic shift structure. For example, the SRS may be configured using a symbol group level that indicates the number of symbols merged to produce a cyclic shift structure, and an extended cyclic shift that indicates a linearly increase in phase rotation across tones in the symbols that are merged according to the symbol group level. In one implementation, the SRS may be additionally or alternatively configured using a symbol level code. For example, an SRS configuration parameter may be an outer code that indicates a multiplier applied to the SRS at the symbol level. The extended cyclic shift and outer code selected for a UE may be used to identify the UE and increases the multiplexing opportunities.

FIG. 1 illustrates an exemplary wireless communications system 100 in which one or both of frequency tone level cyclic shift and symbol level code may be implemented, as discussed herein. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc. The architecture of a gNB may be split into functional parts, e.g., including one or more of a gNB Central Unit (gNB-CU), one or more gNB Distributed Units (gNB-DUs), and one or more gNB Remote Units (gNB-RUs), any of which may be physically co-located or may be physically separate from other parts of the gNB.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
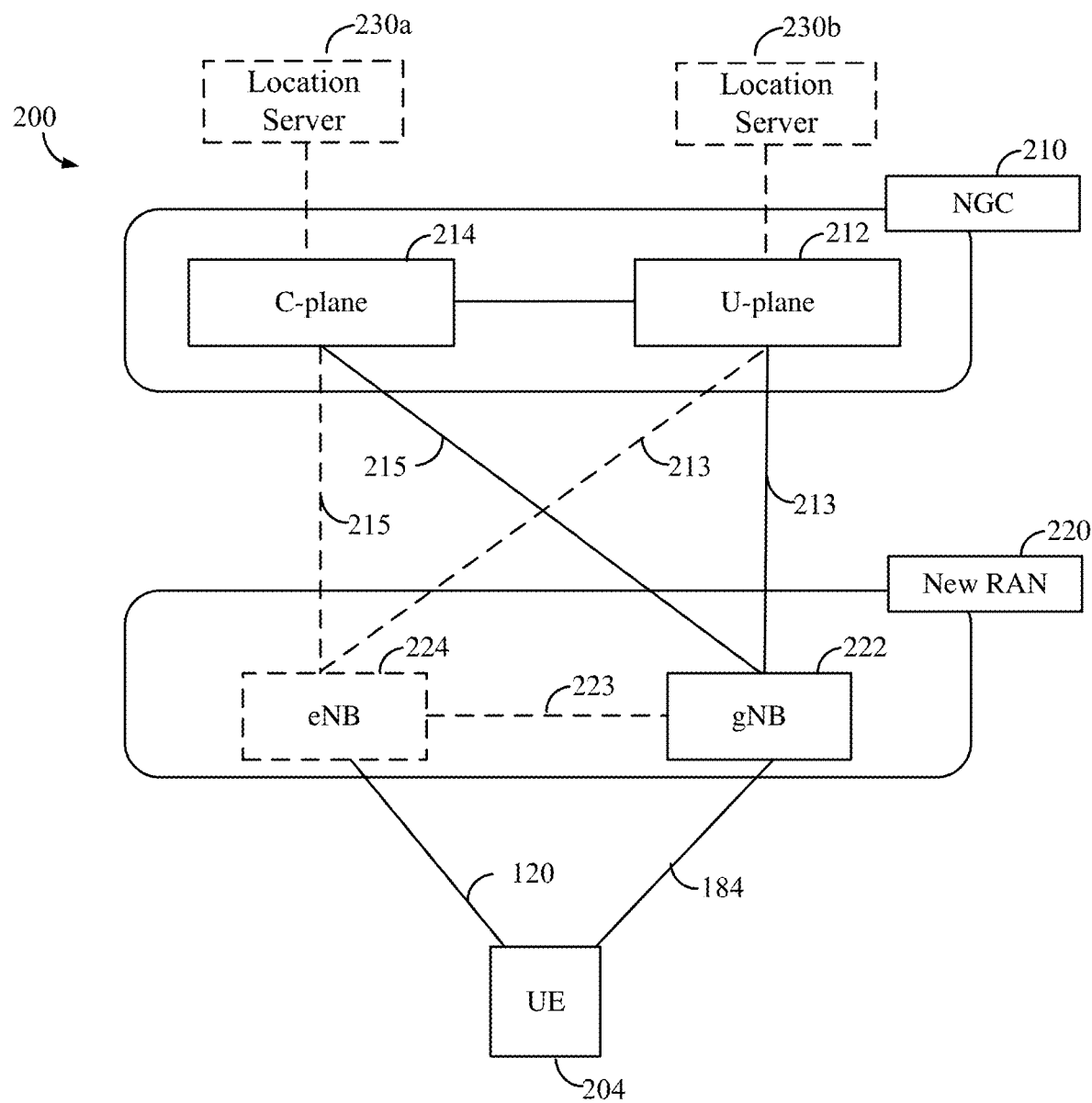
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230a, 230b (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
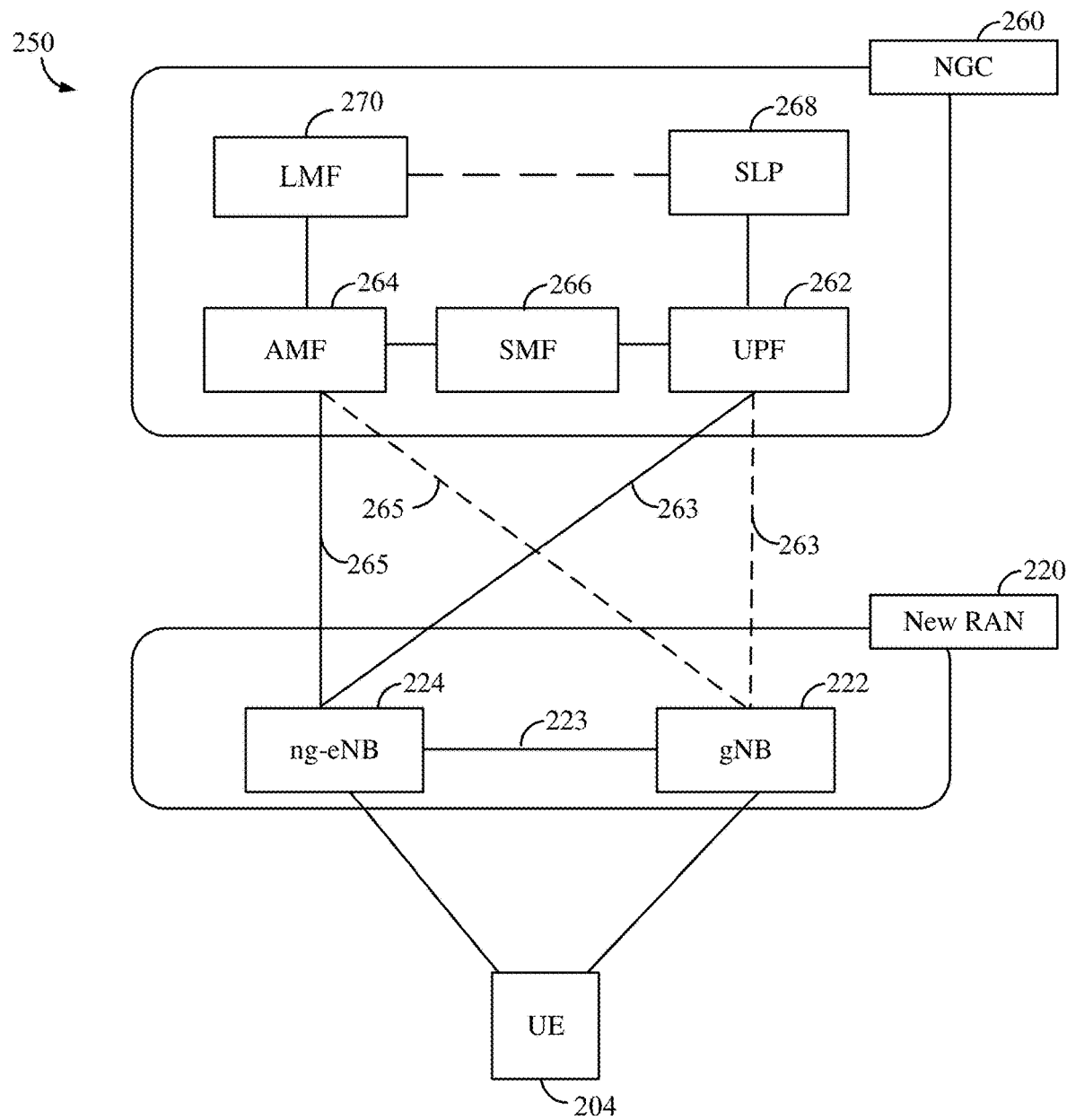

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or eNB 224 may communicate with UEs 204 (e.g., any of the UEs depicted in FIG. 1). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
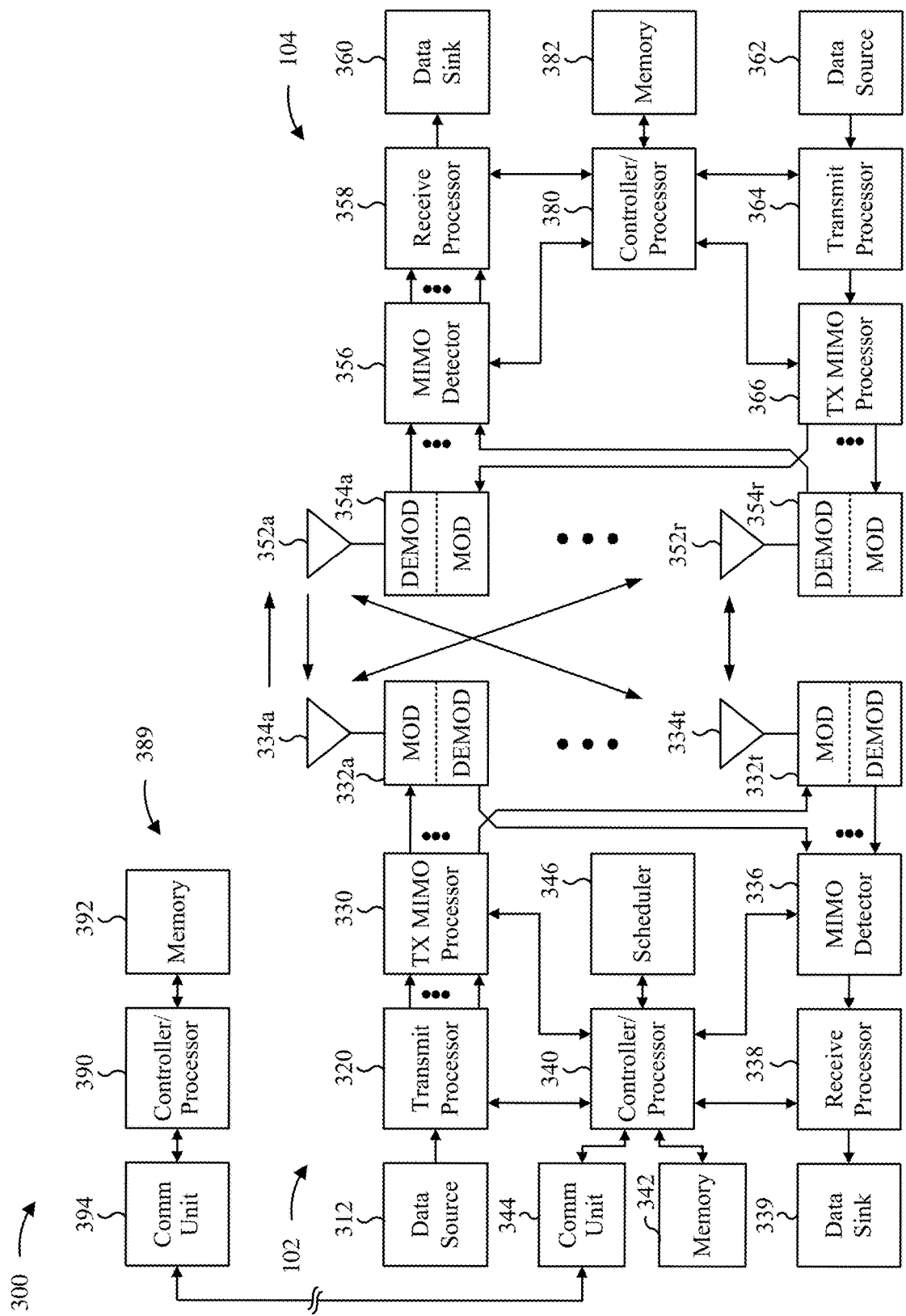
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to network controller 389 via communication unit 344. Network controller 389 may include communication unit 394, controller/processor 390, and memory 392.

Controller/processor 340 of base station 102, controller/processor 380 of UE 104, controller 390 of network controller 389, which may be location server 172, and/or any other component(s) of FIG. 3 may perform one or more techniques associated with configuration of SRS for one or both of frequency tone level cyclic shift and symbol level code, as described in more detail elsewhere herein. For example, controller/processor 380 of UE 104, controller/processor 340 of base station 102, and/or any other component(s) of FIG. 3 may perform or direct operations of, for example, process 1400 and 1500 of FIGS. 14 and 15, and/or other processes as described herein. Memories 342, 382, and 392 may store data and program codes for base station 102, UE 104, and network controller 389, respectively. In some aspects, memory 342 and/or memory 382 and/or memory 392 may comprise a non-transitory computer-readable medium storing one or more instructions for wireless communication. For example, the one or more instructions, when executed by one or more processors of the UE 104 and the base station 102 may perform or direct operations of, for example, process 1400 and 1500 of FIGS. 14 and 15 and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
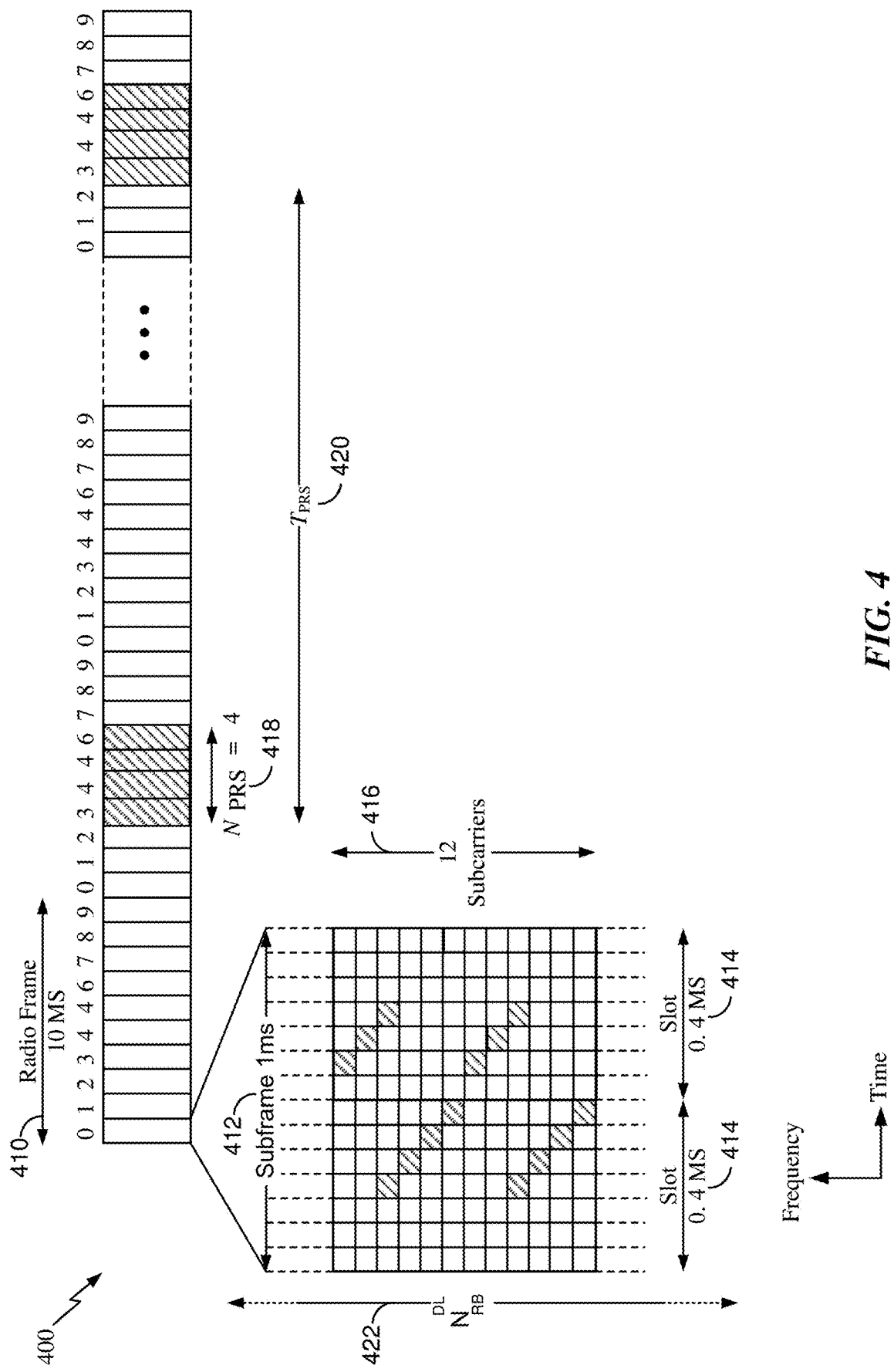
FIG. 4 shows a structure of an exemplary subframe sequence for a positioning reference signal (PRS).

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE/NR systems. However, as used herein, unless otherwise indicated, the terms "positioning reference signal" and "PRS" refer to any type of reference signal that is intended for positioning.

Similar to DL PRS transmitted by base stations, discussed above, a UE may transmit UL sounding reference signals (SRS) for positioning. The UL SRS transmitted by the UE may be used for purposes other than positioning, such as channel estimation.

Using received DL PRS from base stations and/or UL SRS for positioning transmitted to base stations, the UE and/or base station may perform various positioning measurements, such as reference signal time difference (RSTD) measurements for time difference of arrival (TDOA) a positioning technique, reference signal received power (RSRP) measurements for TDOA, Angle of Departure, and Round Trip Time (RTT) or multi cell RTT (multi-RTT) positioning techniques, time difference between reception and transmission of signals (Rx-Tx) for a multi-RTT positioning technique, etc.

Various positioning technologies rely on DL PRS and/or UL SRS. For example, positioning technologies that use reference signal include downlink based positioning, uplink based positioning, and combined downlink and uplink based positioning. For example, downlink based positioning includes positioning methods such as DL-TDOA and DL-AoD. Uplink based positioning includes positioning method such as UL-TDOA and UL-AoA. Downlink and uplink based positioning includes positioning method, such as RTT with one or more neighboring base station (multi-RTT). Other positioning methods exist, including methods that do not rely on PRS. For example, Enhanced Cell-ID (E-CID) is based on radio resource management (RRM) measurements.

FIG. 5 illustrates an exemplary sequence of a 4 symbol, 4 comb SRS 500 with a conventional cyclic shift consistent with 3GGP Technical Specification (TS) 38.211, Release 15. As can be seen, the comb pattern in SRS 500 is unstaggered. In FIG. 5, the cyclic shift is shown with the phase information $e^{j\alpha n}$. The cyclic shift in SRS 500 is based on each respective symbol. For example, SRS 500 is illustrated with a frequency having 24 tones and comb 4. The cyclic shift in SRS 500 is based on each separate symbol, illustrated in FIG. 5 as providing for 6 cyclic shifts in 6 tones, labeled $e^{j\alpha 0}$, $e^{j\alpha 1}$, $e^{j\alpha 2}$, $e^{j\alpha 3}$, $e^{j\alpha 4}$, $e^{j\alpha 5}$, where j is the imaginary unit, and α is the cyclic shift. The maximum number of cyclic shifts α that can be supported with 6 tones is 6 different cyclic shifts.

FIG. 6 illustrates another exemplary sequence of a 4 symbol, 4 comb SRS 600 with a conventional cyclic shift that is consistent with Release 16 of 3GGP TS 38.211. As can been in FIG. 6, the cyclic shift in SRS 600 is similar to SRS 500 shown in FIG. 5, but SRS 600 is configured with a staggered comb pattern. The staggered comb pattern shown in FIG. 6 permits multiplexing of additional UE, which is acceptable for positioning, as the SRS 600 is used for positioning and does not require the same level of accuracy as SRS for channel estimation. Nevertheless, similar to SRS 500, the cyclic shift in SRS 600 is based on each respective symbol, which limits the cyclic shift. For example, the SRS 600 illustrated in FIG. 6, similar to FIG. 5, provides for 6 cyclic shifts in 6 tones, labeled $e^{j\alpha 0}$, $e^{j\alpha 1}$, $e^{j\alpha 2}$, $e^{j\alpha 3}$, $e^{j\alpha 4}$, $e^{j\alpha 5}$. The maximum number of cyclic shifts α that can be supported with 6 tones is 6 different cyclic shifts.

In one implementation, the cyclic shift used in SRS may be extended by jointly processing the cyclic shift over multiple symbols, which is referred to herein as extended cyclic shift. For example, instead of processing the cyclic shift over N separate symbols, a number of the N symbols may be associated for joint processing and the extended cyclic shift linearly increases the phase rotation across the tones in the associated symbols to produce a cyclic shift structure.

Figure 7:
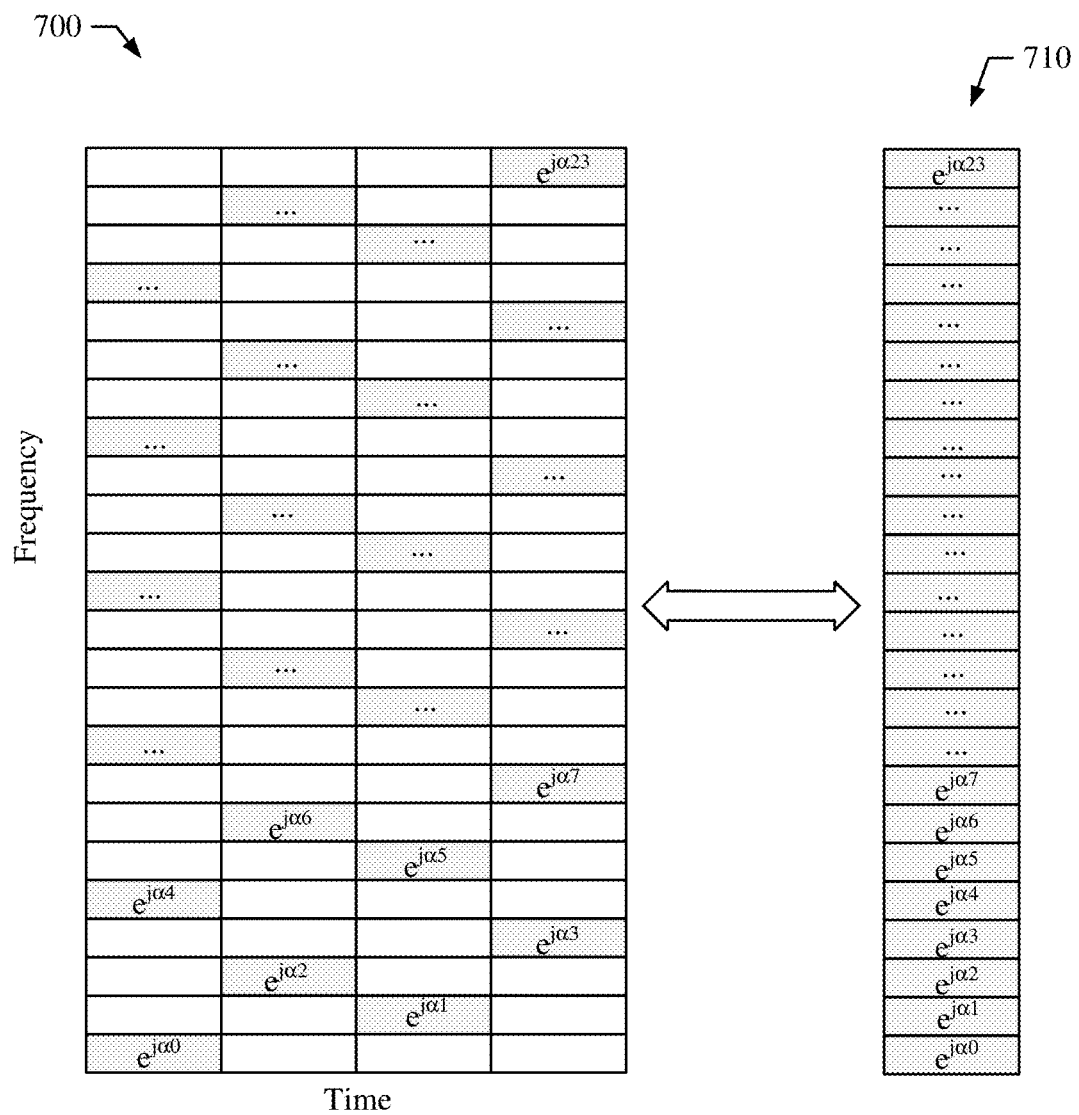
FIG. 7 illustrates an example of a 4 symbol, 4 comb SRS that is configured with frequency tone level cyclic shift by jointly processing the cyclic shift over multiple merged symbols.

FIG. 7, for example, illustrates a 4 symbol, 4 comb SRS 700 that is configured with frequency tone level cyclic shift by jointly processing the cyclic shift over multiple associated symbols. FIG. 7 illustrates the SRS 700 with the extended configured cyclic shift that is transmitted by the UE 104 and received by the base station 102. FIG. 7 additionally shows associated symbols 710 that visually illustrates the 4 symbols of SRS 700 merged for joint processing with the extended cyclic shift linearly increasing the phase rotation across the tones in the merged symbols 710 to produce the cyclic shift structure of SRS 700. The associated symbols 710 may sometimes be referred to herein as merged symbols 710. It should be understood that merged symbols 710 are shown merely as an illustration of multiple symbols being merged and processing based on the extended cyclic shift, e.g., by the UE 104 prior to transmitting the SRS 700 or by a base station 102 that receives the SRS 700, and that the UE 104 transmits the SRS 700, not the merged symbols 710.

As illustrated in FIG. 7, the cyclic shift of the SRS 700 is not based on each respective symbol, as performed in conventional SRS 500 and SRS 600, shown in FIGS. 5 and 6. The extended cyclic shift used with SRS 700 is processed based on the association of the symbols in SRS 700, illustrated by merged symbols 710. For example, FIG. 7 illustrates that the 4 symbols for SRS 700 may be merged into 1 merged symbol 710, and the extended cyclic shift linearly increases the phase rotation across all tones in the merged symbol 710. For example, SRS 700 is illustrated with 4 symbols, with a frequency having 24 tones and comb 4. By merging the 4 symbols of SRS 700 for processing the extended cyclic shift, as illustrated by merged symbols 710, the SRS 700 is produced with ideally 24 cyclic shifts in 24 tones, labeled $e^{j\alpha 0}$, $e^{j\alpha 1}$, $e^{j\alpha 2}$, $e^{j\alpha 3}$, $e^{j\alpha 4}$, $e^{j\alpha 5}$, $e^{j\alpha 6}$, $e^{j\alpha 7}$, ... $e^{j\alpha 23}$. Thus, as can be seen, jointly processing the cyclic shift over multiple merged symbols as illustrated in FIG. 7, produces a significant increase in the number of cyclic shifts, compared to processing the cyclic shift based on separate symbols, as illustrated in FIGS. 5 and 6.

While FIG. 7 illustrates 4 symbols in the SRS 700 merged into 1 merged symbol 710 for processing the cyclic shift, it should be understood that the 4 symbols in the SRS 700 may be merged into a different number of merged symbols, e.g., the 4 symbols may be merged into 2 symbols for processing the cyclic shift. The number of symbols that are merged to produce a cyclic shift structure may be configured by a symbol group level parameter in the SRS configuration information. The symbol group level indicates the number of merged symbols that are jointly processed, and may be a function of the number of symbols and the comb number.

For example, FIG. 7 illustrates processing of 1 merged symbol and, thus, may have a symbol group level of 1. If configured with a symbol group level of 2, the 4 symbols in the SRS 700 would be merged into 2 merged symbols that are each jointly processed. If configured with a symbol group level of 4, the 4 symbols in the SRS 700 would be merged into 4 merged symbols (i.e., equivalent to not merging the symbols) that are each jointly processed, which is consistent with conventional processing (e.g., illustrated in FIG. 6), and thus, the use of the symbol group level to configure the SRS is backwards compatible.

Table 1, for example, provide the Release-16 comb staggering offset $k_{offset}^{l'}$ for SRS as a function of comb number $K_{TC}$ and index of the OFDM symbol l' And number of SRS OFDM symbol $N_{symb}^{SRS}$. For example, FIG. 6 shows the staggering pattern 0,2,1,3 for $N_{symb}^{SRS}=4$ and $K_{TC}=4$. Adjacent SRS symbols may be merged when the merged symbol has a frequency comb structure.

TABLE 1

| | | | $k_{offset}^{0}, \ldots, k_{offset}^{N_{symb}^{SRS}-1}$ | | |
|---|---|---|---|---|---|
| $K_{TC}$ | $N_{symb}^{SRS} = 1$ | $N_{symb}^{SRS} = 2$ | $N_{symb}^{SRS} = 4$ | $N_{symb}^{SRS} = 8$ | $N_{symb}^{SRS} = 12$ |
| 2 | 0 | 0, 1 | 0, 1, 0, 1 | — | — |
| 4 | — | 0, 2 | 0, 2, 1, 3 | 0, 2, 1, 3, 0, 2, 1, 3 | 0, 2, 1, 3, 0, 2, 1, 3, 0, 2, 1, 3 |
| 8 | — | — | 0, 4, 2, 6 | 0, 4, 2, 6, 1, 5, 3, 7 | 0, 4, 2, 6, 1, 5, 3, 7, 0, 4, 2, 6 |

For SRS with 2 symbols, a symbol group level of 1 or 2 may be used, indicating that the 2 symbols may be merged and processed as 1 symbol, or the 2 symbols may be processed as 2 symbols.

For SRS with 4 symbols with 4 comb, e.g., as illustrated in FIG. 7, a symbol group level of 1 or 2 or 4 may be used, indicating that the 4 symbols may be merged and processed as 1 symbol, or merged and processed as 2 symbols, or the 4 symbols may be processed as 4 symbols.

For SRS with 4 symbols with 2 comb, a symbol group level of 1 or 2 may be used, indicating that the 4 symbols may be merged and processed as 1 symbol, or merged and processed as 2 symbols.

For SRS with 4 symbols with 8 comb, a symbol group level of 1 or 2, or 4 may be used, indicating that the 4 symbols may be merged and processed as 1 symbol, or that the 4 symbols may be merged and processed as 2 symbols, or the 4 symbols may be processed as 4 symbols.

For SRS with 8 symbols with 4 comb, a symbol group level of 2 or 4 or 8 may be used, indicating the 8 symbols may be merged and processed as 2 symbols, or that the 8 symbols may be merged and processed as 4 symbols, or that the 8 symbols may be processed as 8 symbols.

For SRS with 8 symbols with 8 comb, a symbol group level of 1 or 2 or 4 or 8 may be used, indicating the 8 symbols may be merged and processed as 1 symbol, the 8 symbols may be merged and processed as 2 symbols, the 8 symbols may be merged and processed as 4 symbols, or that the 8 symbols may be processed as 8 symbols.

For SRS with 12 symbols and 4 or 8 comb size, a symbol group level of 3 or 6 or 12 may be used, indicating the 12 symbols may be merged and processed as 3 symbols, the 12 symbols may be merged and processed as 6 symbols, or that the 12 symbols may be processed as 12 symbols.

In conjunction with the symbol group level, the SRS configuration includes the extended cyclic shift that indicates the increase in phase rotation across tones in the symbols that are merged according to the symbol group level. The extended cyclic shift, which enables the feasible values for α to increase. For example, in FIGS. 5 and 6, the cyclic shift for a can be selected from {0, 2π/6, ... 2π×5/6} ideally with 6 tones. In FIG. 7, the cyclic shift for a can be selected from {0, 2π/24, ... 2π×23/24} ideally with 24 tones.

Thus, the SRS generated and transmitted by the UE 104 and received and processed by the base station(s) may be configured based on symbol group size and extended cyclic shift, as well as conventional parameters, such as bandwidth, number of symbols, and comb size, e.g., as detailed in 3GPP TS 38.211.

The merging of 4 symbols into 1 merged symbol for processing the extended cyclic shift, as illustrated in FIG. 7, may not be suitable for all UEs. For example, with high doppler UEs, merging 4 symbols into 1 merged symbol may result in unacceptable performance degradation. Thus, as discussed above, the 4 symbols may be merged into 2 separate symbols, and each of the 2 merged symbols is processed with the extended cyclic shift.

In another implementation, the two pairs of 2 symbols that correspond to the 2 merged symbols, may be further separated based on an outer code that indicates a multiplier that is applied to the SRS at the symbol level. The outer code, for example, increases the multiplexing capacity by serving as an identifier for the UE relative to other UEs that may transmit SRS using a same symbol group level and a same extended cyclic shift, but with a different outer code.

Figure 8:
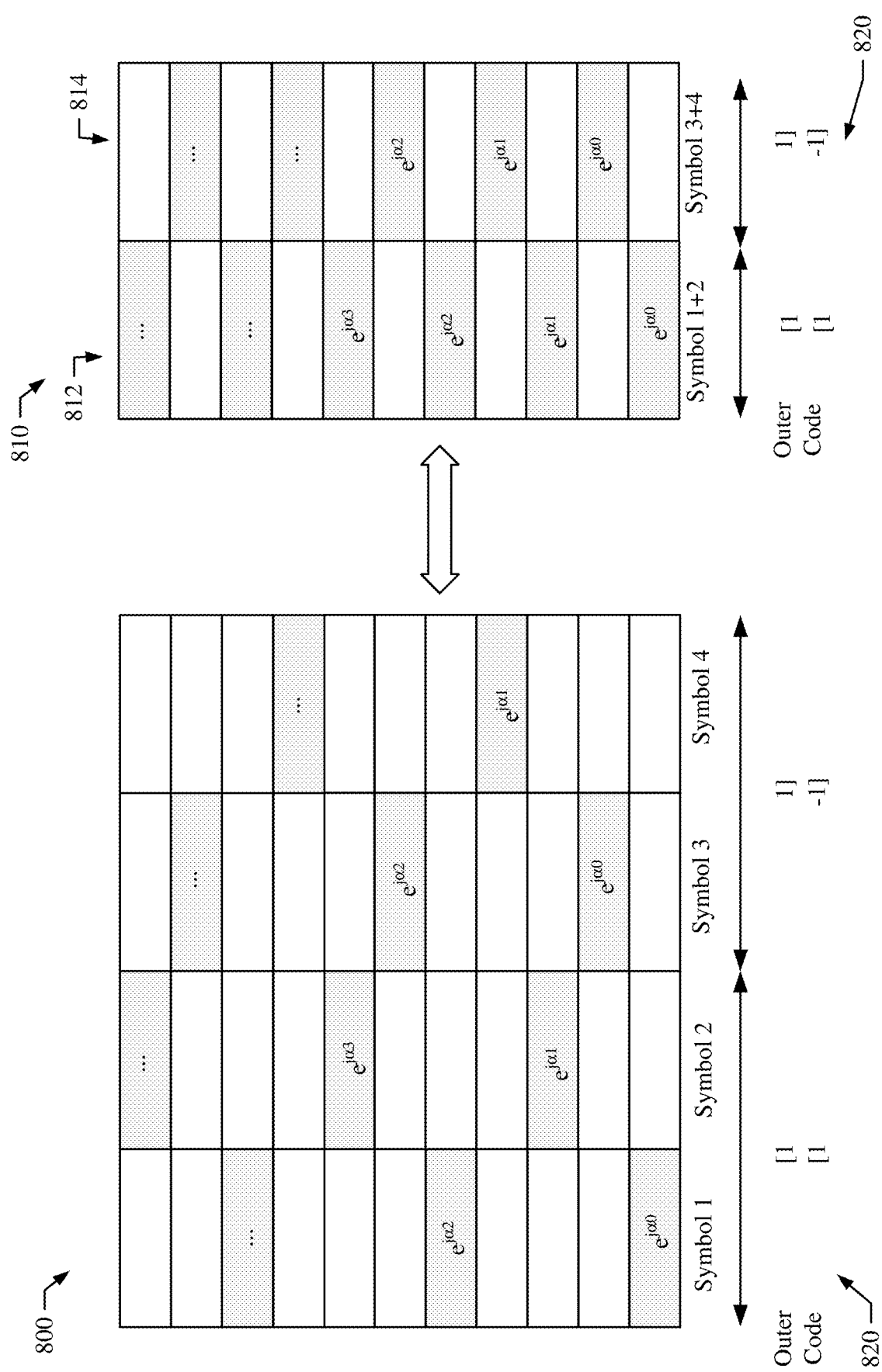
FIG. 8 illustrates an example of a 4 symbol, 4 comb SRS that is configured with frequency tone level cyclic shift and symbol level code by jointly processing the cyclic shift over multiple merged symbols and implementing an outer code.

FIG. 8, for example, illustrates a 4 symbol, 4 comb SRS 800 that is configured with frequency tone level cyclic shift and symbol level code by jointly processing the cyclic shift over multiple associated symbols and implementing an outer code. FIG. 8 illustrates the SRS 800 with the configured extended cyclic shift that is transmitted by the UE 104 and received by the base station 102 and additionally illustrates the associated symbols 810 that visually illustrates the 4 symbols of SRS 800 merged into two associated symbols 812 and 814 for joint processing with the extended cyclic shift linearly increasing the phase rotation across the tones in the pair of merged symbols 812, 814 to produce the cyclic shift structure of SRS 800. The associated symbols 810, 812, and 814 may sometimes be referred to herein as merged symbols 810, 812 and 814. As with FIG. 7, it should be understood that merged symbols 810 are shown merely as an illustration of multiple symbols being merged and processing based on the extended cyclic shift, e.g., by the UE 104 prior to transmitting the SRS 800 or by a base station 102 that receives the SRS 800, and that the UE 104 transmits the SRS 800, not the merged symbols 810.

As illustrated in FIG. 8, two pairs of symbols in SRS 800 are merged, symbol 1 and symbol 2 are merged to form merged symbols 812 (indicated by symbols 1+2) and symbol 3 and symbol 4 are merged to form merged symbols 814 (indicated by symbols 3+4). Thus, for example, SRS 800 may be configured based on a symbol group level of 2, and based on the extended cyclic shift α.

Additionally, the SRS 800 may be further configured using an outer code 820 to, e.g., increase the multiplexing capacity of the SRS 800. The outer code 820 is a multiplier that is applied to the SRS at the symbol level. For example, as illustrated in FIG. 8, the outer code 820 may be [1,1] or [1,−1]. Thus, with outer code 820 [1, 1], symbols 1 and 2 are multiplied by 1, and symbols 3 and 4 are multiplied by 1. On the other hand with outer code 820 [1, −1], symbols 1 and 2 are multiplied by 1, and symbols 3 and 4 are multiplied by −1. Other multipliers may be used if desired. The use of the outer code 820 shown in FIG. 8 doubles the multiplexing capacity of SRS 800.

Thus, the UE 104 may be identified from the SRS 800 based on selection of the extended cyclic shift α, and the outer code 820 [1,1] or [1,−1]. In some implementations, the UE 104 may be provided with SRS configuration information that includes available options for the symbol group level, the extended cyclic shift, and outer code, and the UE 104 may select a combination as an identifier. The UE 104, for example, may provide an indication of the selection to the serving base station 102. In other implementations, the serving base station 102 may choose a combination of parameters for the UE 104 and transmit to the UE 104 the selected symbol group level, the extended cyclic shift, and outer code in the SRS configuration information.

Thus, the SRS generated and transmitted by the UE 104 and received and processed by the base station(s) may be configured based on symbol group size, extended cyclic shift, and outer code, as well as conventional parameters, such as bandwidth, number of symbols, and comb size, e.g., as detailed in 3GPP 38.211.

As illustrated in FIG. 8, the phase of the first tone in symbols 2 and 4 is affected by the extended cyclic shift and, accordingly, the configuration illustrated in FIG. 8 is not backwards compatible with Release 16, illustrated in FIG. 6. In some implementations, the outer code may be used to provide backwards compatibility. For example, a common phase shift may be included in the outer code, and the configured SRS may be consistent with Release 16.

Figure 9:
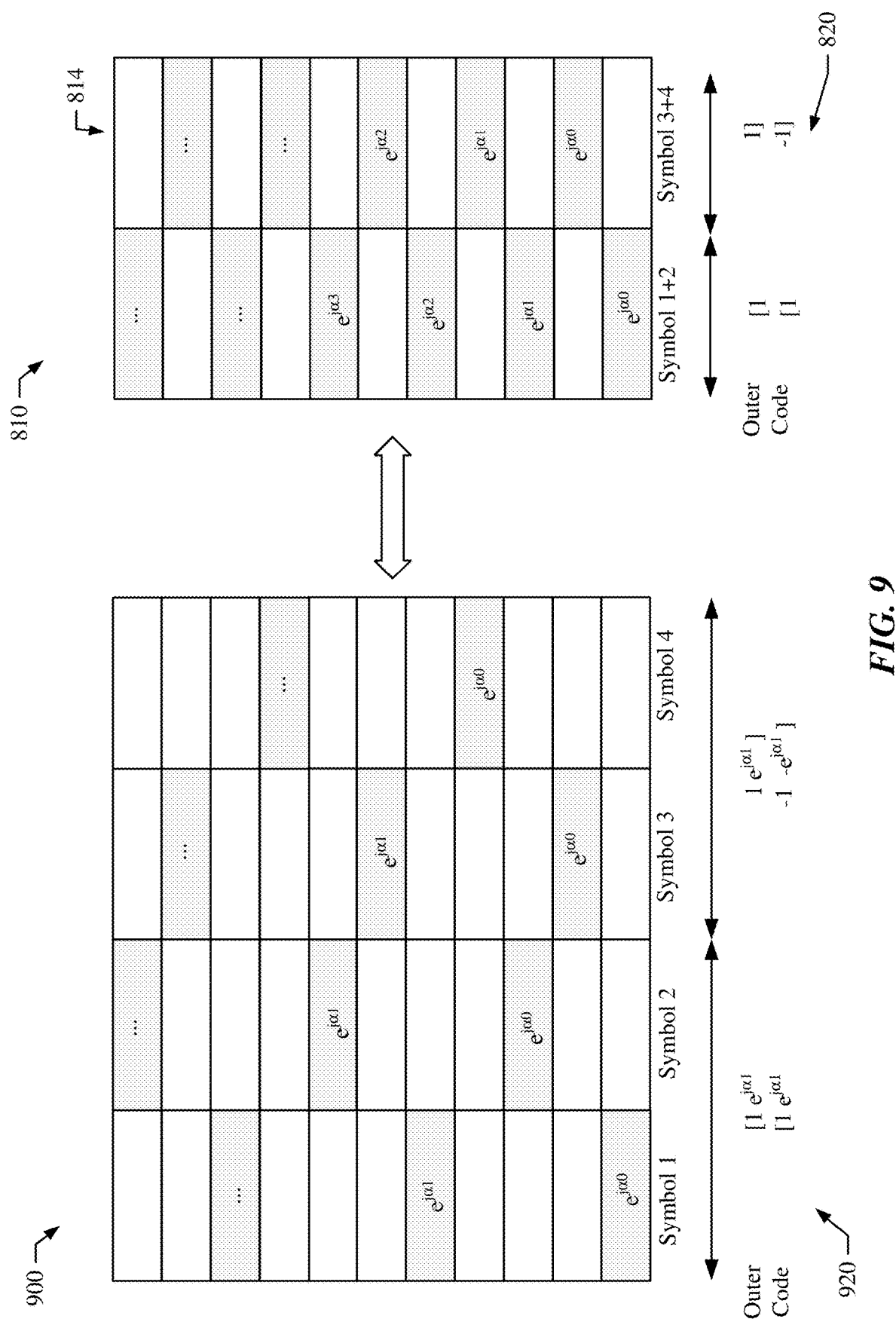
FIG. 9 illustrates another example of a 4 symbol, 4 comb SRS that is configured with frequency tone level cyclic shift and symbol level code by jointly processing the cyclic shift over multiple merged symbols and implementing an outer code.

FIG. 9, for example, illustrates a 4 symbol, 4 comb SRS 900 that is configured with frequency tone level cyclic shift and symbol level code by jointly processing the cyclic shift over multiple merged symbols and implementing an outer code that includes a common phase. FIG. 9 is similar to FIG. 8, and illustrates the SRS 900 with the configured extended cyclic shift that is transmitted by the UE 104 and received by the base station 102 and additionally illustrates merged symbols 810, which as shown in FIG. 8 visually illustrates the 4 symbols of SRS 800 merged into two merged symbols 812 and 814 for joint processing with the cyclic shift linearly increasing the phase rotation across the tones in the pair of merged symbols 812, 814. As with FIG. 7, it should be understood that merged symbols 810 are shown merely as an illustration of multiple symbols being merged and processing based on the extended cyclic shift, e.g., by the UE 104 prior to transmitting the SRS 900 or by a base station 102 that receives the SRS 900, and that the UE 104 transmits the SRS 900, not the merged symbols 910.

The merged symbols 810 may be used to generate the SRS 900 along with an outer code 920 that includes a common phase shift for at least a portion of the merged symbols that operates as a multiplier that is applied to the SRS at the symbol level. For example, as illustrated in FIG. 9, the outer code 920 may be $[1,e^{j\alpha 1},1,e^{j\alpha 1}]$ or $[1,e^{j\alpha 1},-1,-e^{j\alpha 1}]$. Thus, with outer code 920 $[1,e^{j\alpha 1},1,e^{j\alpha 1}]$, symbol 1 is multiplied by 1, symbol 2 is multiplied by $e^{j\alpha 1}$, symbol 3 is multiplied by 1, and symbol 4 is multiplied by $e^{j\alpha 1}$. On the other hand with outer code 920 $[1,e^{j\alpha 1},-1,-e^{j\alpha 1}]$, symbol 1 is multiplied by 1, symbol 2 is multiplied by $e^{j\alpha 1}$, symbol 3 is multiplied by −1, and symbol 4 is multiplied by $-e^{j\alpha 1}$. Thus, SRS 900 with outer code 920 is equivalent to SRS 800 with outer code 820, shown in FIG. 8. Advantageously, the feasible value of α is doubled with SRS 900, as 2 symbols are merged for the cyclic shift, thereby increasing the multiplexing capacity. Further, SRS 900 (without the outer code 920) has the same pattern shown in SRS 600, and thus is backwards compatible.

Thus, the UE 104 may be identified from the SRS 900 based on selection of the extended cyclic shift α, and the outer code 920. In some implementations, the UE 104 may be provided with SRS configuration information that includes available options for the symbol group level, the extended cyclic shift, and outer code, and the UE 104 may select a combination as an identifier. The UE 104, for example, may provide an indication of the selection to the serving base station 102. In other implementations, the serving base station 102 may choose a combination of parameters for the UE 104 and transmit to the UE 104 the selected symbol group level, the extended cyclic shift, and outer code in the SRS configuration information.

If desired, other multipliers may be used if desired. Moreover, the outer code used may depend on the symbol group level. For example, for the symbol group level 1, e.g., as illustrated in FIG. 7, because there is 1 merged symbol, it may not be desirable to implement an outer code with the SRS 700.

Figure 10:
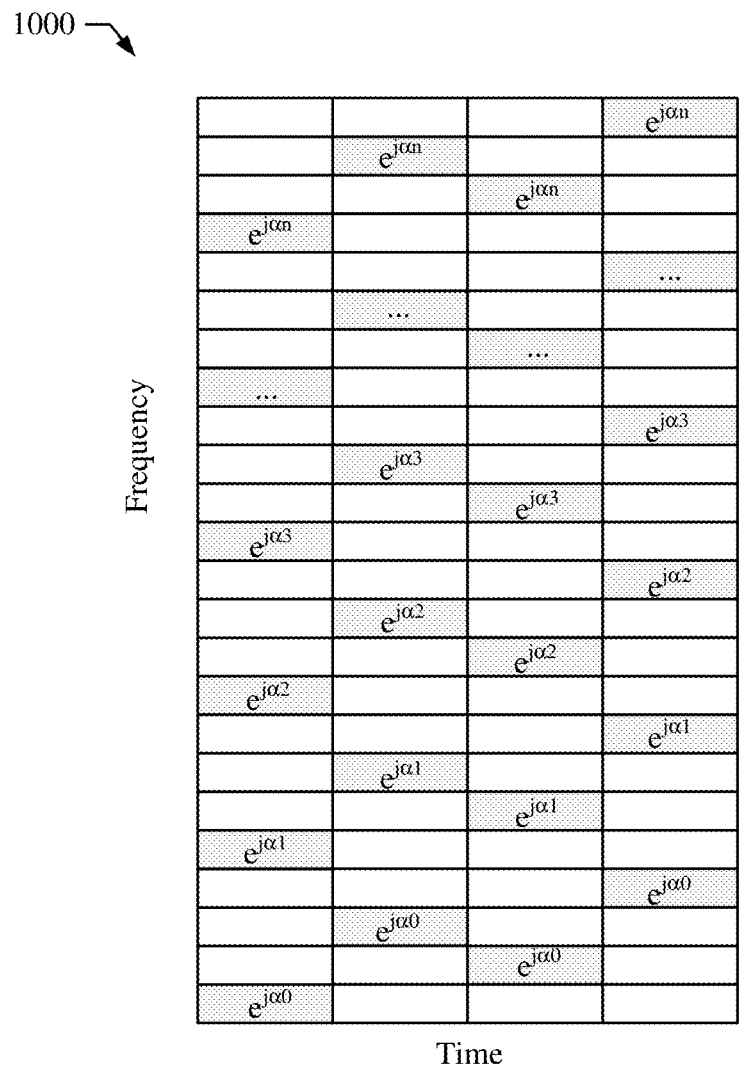
FIG. 10 illustrates an example of a 4 symbol, 4 comb SRS that is configured with symbol level code by implementing an outer code.

FIG. 10, for example, illustrates an example of a 4 symbol, 4 comb SRS 1000 that is configured with symbol level code by implementing an outer code. The SRS 1000 in FIG. 10 may the same as shown in FIG. 6, but further includes an outer code 1020 that may be one of a several possible outer codes, e.g., [1,1,1,1], [1,j,−1,−j], [1,−j−1,j], or [1,−1,1,−1]. Other outer codes may be possible. For example, a set of possible outer codes can be a set or subset of orthogonal basis including Fourier basis and Hadamard basis. The use of multiple outer codes 1020 shown in FIG. 10 increases the multiplexing capacity of SRS 1000, while maintaining backwards compatibility. Thus, the UE 104 may be identified from the SRS 1000 based on selection of the outer code 1020, which may be selected by the UE 104 or by the serving base station 102.

Thus, the SRS generated and transmitted by the UE 104 and received and processed by the base station(s) may be configured based on outer code, as well as conventional parameters, such as bandwidth, number of symbols, and comb size, e.g., as detailed in 3GPP 38.211.

Figure 11:
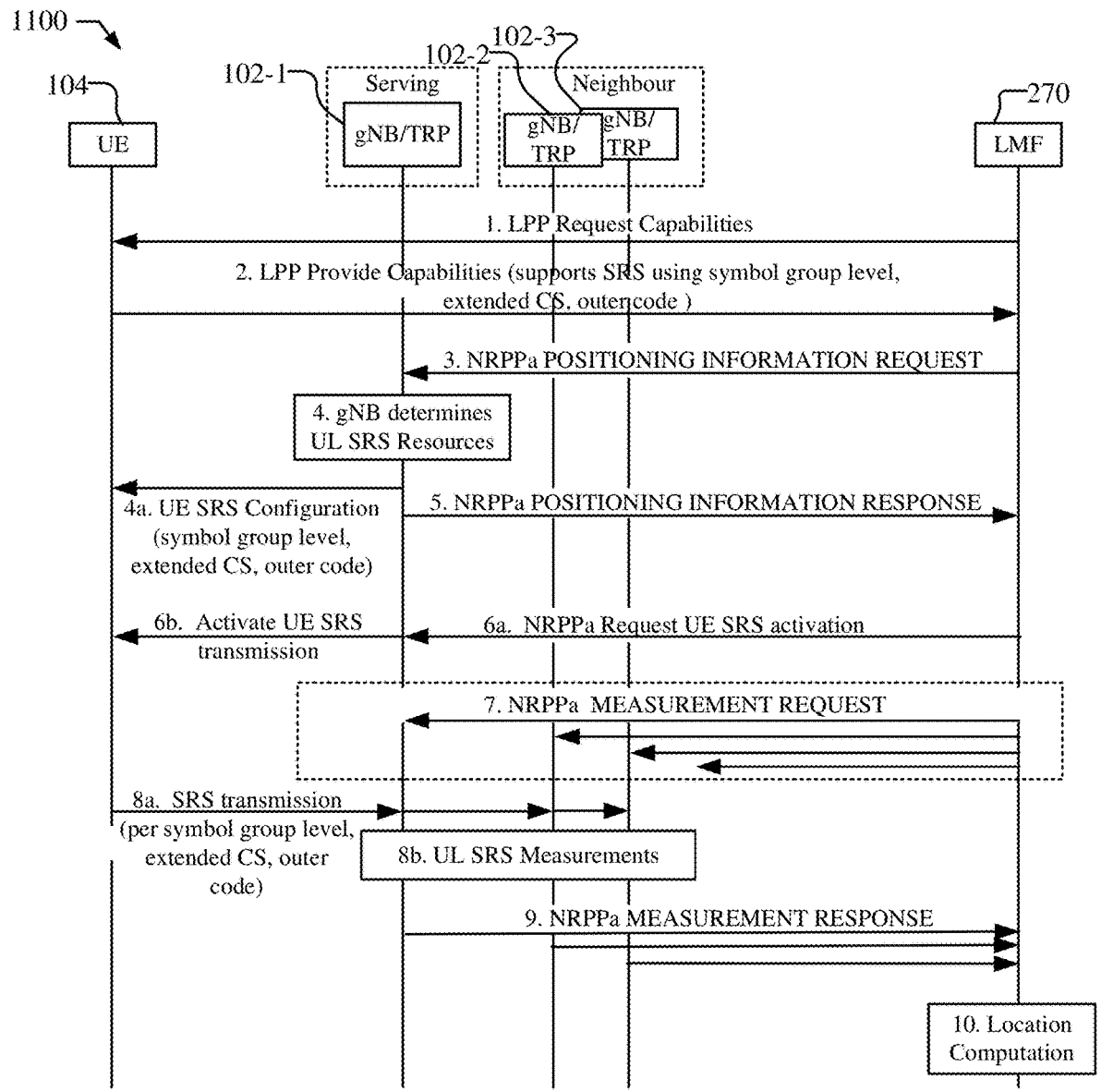
FIG. 11 is a message flow illustrating the messaging between the location server, the base station, and the user equipment (UE) for positioning using UL SRS configured for one or both of frequency tone level cyclic shift and symbol level outer code.

FIG. 11 is a message flow 1100 illustrating the messaging between the LMF 270, gNBs 102, and the UE 104 for positioning using UL SRS configured for frequency tone level cyclic shift and symbol level outer code, as discussed in FIGS. 7-10. The serving gNB 102-1 and multiple neighboring gNBs 102-2 and 102-3 may be sometimes collectively referred to as gNBs 102. The procedure illustrated in FIG. 11 is illustrated for UL SRS for positioning measurements by the gNBs 102, e.g., RSTD, Rx-Tx time difference measurements for UL-TDOA, UL-AoA. In some implementations, additional signaling may occur for DL measurements by the UE 104, such as Rx-Tx time difference measurements, which may be used with the UL SRS measurements for RTT or Multi-RTT positioning techniques. Moreover, while the SRS configured for extending the cyclic shift and symbol level outer code, as discussed in FIGS. 7-10, is illustrated in FIG. 11 in the context of positioning of the UE 104, it should be understood that the SRS may be used for non-positioning purposes, such as channel estimation. Additional, different, or fewer messages that shown in message flow 1100 may be used for positioning. For example, additional messages may be used to initiate and end the positioning session, e.g., in a Mobile Terminating Location Request (MT-LR) or a Mobile Originated Location Request (MO-LR), or periodic or triggered positioning procedures.

At stage 1, the LMF 270 may request the positioning capabilities of the UE 104 using a LPP Capability Transfer procedure.

At stage 2, the UE 104 may send an LPP Provide Capabilities message, which may indicate that the UE 104 supports extended cyclic shift and/or symbol level outer code. For example, the LPP Provide Capabilities message may provide an indication that the UE 104 supports SRS that may be configured using the symbol group level and extended cyclic shift, the outer code, or a combination thereof.

At stage 3, the LMF 270 sends a NRPPa POSITIONING INFORMATION REQUEST message to the serving gNB 102-1 to request UL information for the UE 104.

At stage 4, the serving gNB 102-1 determines the resources available for UL SRS and configures the UE 104 with the UL-SRS resource sets at stage 4a. The UE 104 may be configured with SRS configuration information, such as the bandwidth, the number of symbols, the comb number, as well as with the symbol group level and extended cyclic shift, the outer code, or a combination thereof.

At stage 5, the serving gNB 102-1 provides the UL SRS configuration information to the LMF 270 in a NRPPa POSITIONING INFORMATION RESPONSE message. The serving gNB 102-1 provide the SRS configuration information including the symbol group level and extended cyclic shift, the outer code, or a combination thereof, to the LMF 270.

At stage 6a, the LMF 270 may send an NRPPa Request UE SRS activation message to the serving gNB 102-1. At stage 6b, the serving gNB 102-1 may activate the UE SRS transmission.

At stage 7, the LMF 270 may provide the UL information to the selected gNBs 102 in a NRPPa MEASUREMENT REQUEST message. The message may include the SRS configuration information for the UE 104 including the symbol group level and extended cyclic shift, the outer code, or a combination thereof.

At stage 8a, the UE 104 prepares the SRS per the SRS configuration information, including the symbol group level and extended cyclic shift, the outer code, or a combination thereof, and transmits the SRS to the gNBs 102. At stage 8b, each gNB 102 configured at stage 7, receives the SRS transmitted by the UE 104 and processes the SRS based on the SRS configuration information for the UE 104, including the symbol group level and extended cyclic shift, the outer code, or a combination thereof, and performs the requested UE SRS measurement.

At stage 9, each of the gNBs 102 reports the UE SRS measurements to the LMF 270 in NRPPa Measurement Response messages.

At stage 10, the LMF 270 may determine a position estimate for the UE 104 using the SRS measurements received at stage 9, as well as any position measurements of DL PRS performed by the UE 104 and received by the LMF 270 from the UE 104 (not shown). In some implementations, the gNBs 102 may report the UE SRS measurements to the UE 104 in stage 9 and the UE 104 may determine a position estimate based on the UE SRS measurements and any position measurements of DL PRS performed by the UE 104.

Figure 12:
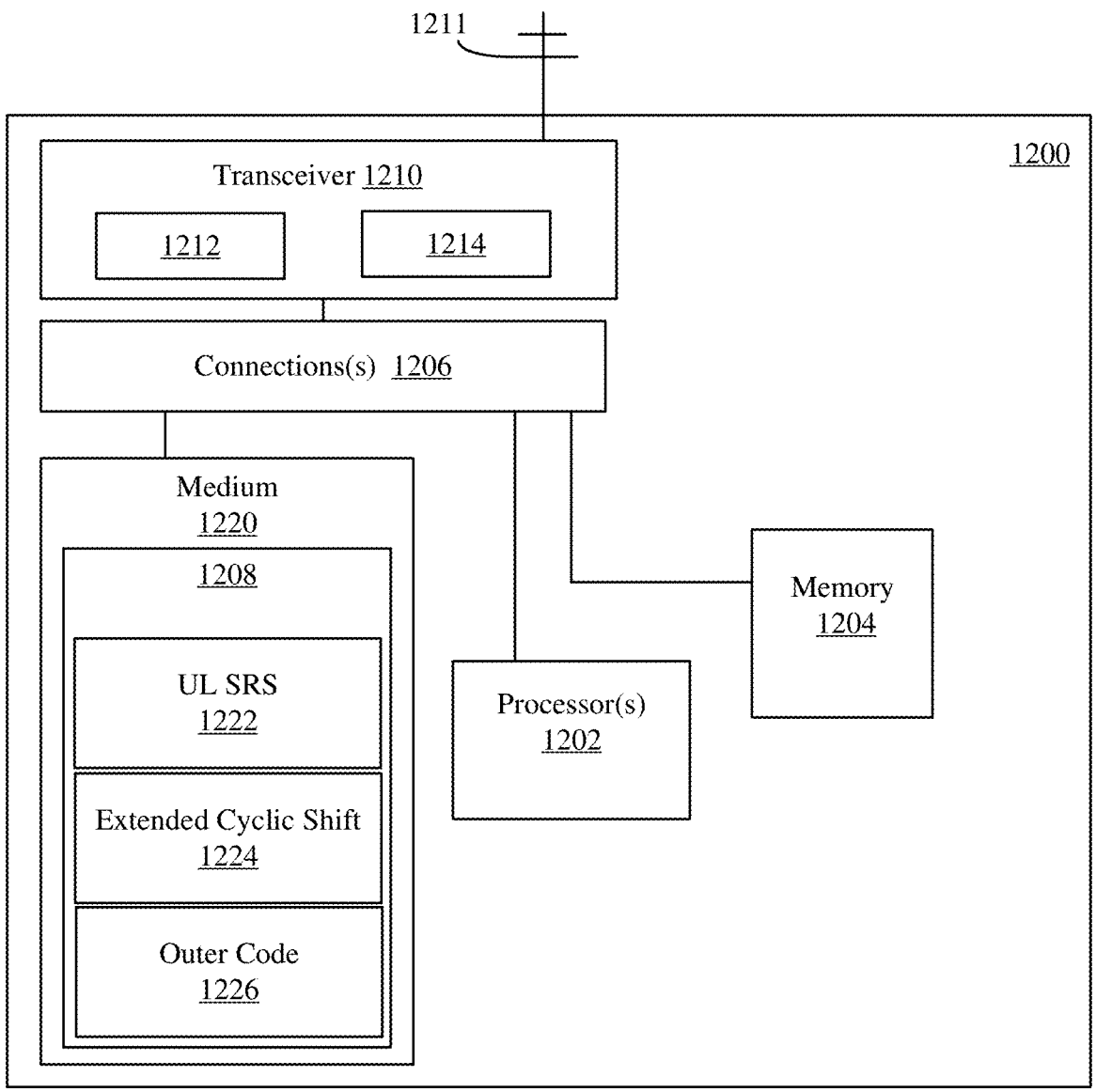
FIG. 12 shows a schematic block diagram illustrating certain exemplary features of a UE enabled to support the configuration of SRS with frequency tone level cyclic shift and/or symbol level code.

FIG. 12 shows a schematic block diagram illustrating certain exemplary features of a UE 1200, e.g., which may be UE 104 shown in FIG. 1, enabled to support the configuration of SRS with frequency tone level cyclic shift and/or symbol level code, e.g., using symbol group level and an extended cyclic shift, an outer code or a combination thereof, as described herein, e.g., in FIGS. 7-11. The UE 1200 may be configured to perform the process flow shown in FIG. 14. UE 1200 may, for example, include one or more processors 1202, memory 1204, an external interface such as a transceiver 1210 (e.g., wireless network interface), which may be operatively coupled with one or more connections 1206 (e.g., buses, lines, fibers, links, etc.) to non-transitory computer readable medium 1220 and memory 1204. The UE 1200 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 1200 may take the form of a chipset, and/or the like. Transceiver 1210 may, for example, include a transmitter 1212 enabled to transmit one or more signals over one or more types of wireless communication networks and a receiver 1214 to receive one or more signals transmitted over the one or more types of wireless communication networks.

In some embodiments, UE 1200 may include antenna 1211, which may be internal or external. UE antenna 1211 may be used to transmit and/or receive signals processed by transceiver 1210. In some embodiments, UE antenna 1211 may be coupled to transceiver 1210. In some embodiments, measurements of signals received (transmitted) by UE 1200 may be performed at the point of connection of the UE antenna 1211 and transceiver 1210. For example, the measurement point of reference for received (transmitted) RF signal measurements may be an input (output) terminal of the receiver 1214 (transmitter 1212) and an output (input) terminal of the UE antenna 1211. In a UE 1200 with multiple UE antennas 1211 or antenna arrays, the antenna connector may be viewed as a virtual point representing the aggregate output (input) of multiple UE antennas. In some embodiments, UE 1200 may measure received signals including signal strength and TOA measurements and the raw measurements may be processed by the one or more processors 1202.

The one or more processors 1202 may be implemented using a combination of hardware, firmware, and software. For example, the one or more processors 1202 may be configured to perform the functions discussed herein by implementing one or more instructions or program code 1208 on a non-transitory computer readable medium, such as medium 1220 and/or memory 1204. In some embodiments, the one or more processors 1202 may represent one or more circuits configurable to perform at least a portion of a data signal computing procedure or process related to the operation of UE 1200.

The medium 1220 and/or memory 1204 may store instructions or program code 1208 that contain executable code or software instructions that when executed by the one or more processors 1202 cause the one or more processors 1202 to operate as a special purpose computer programmed to perform the techniques disclosed herein. As illustrated in UE 1200, the medium 1220 and/or memory 1204 may include one or more components or modules that may be implemented by the one or more processors 1202 to perform the methodologies described herein. While the components or modules are illustrated as software in medium 1220 that is executable by the one or more processors 1202, it should be understood that the components or modules may be stored in memory 1204 or may be dedicated hardware either in the one or more processors 1202 or off the processors. A number of software modules and data tables may reside in the medium 1220 and/or memory 1204 and be utilized by the one or more processors 1202 in order to manage both communications and the functionality described herein. It should be appreciated that the organization of the contents of the medium 1220 and/or memory 1204 as shown in UE 1200 is merely exemplary, and as such the functionality of the modules and/or data structures may be combined, separated, and/or be structured in different ways depending upon the implementation of the UE 1200.

The medium 1220 and/or memory 1204 may include an UL SRS module 1222 that when implemented by the one or more processors 1202 configures the one or more processors 1202 to receive an SRS configuration, e.g., via the transceiver 1210, and to prepare the SRS according to the configuration, e.g., as discussed in FIGS. 7-10. For example, the one or more processors 1202 may be configured to generate the SRS based on a symbol group level indicating a number of symbols associated to produce a cyclic shift structure, and an extended cyclic shift indicating a linear increase in phase rotation across tones in the symbols that are associated according to the symbol group level, as well as an outer code indicating a multiplier applied to the SRS at the symbol level. The one or more processors 1202 may be configured to generate the SRS based on configuration parameters, such as bandwidth, a number of symbols and a comb size. The one or more processors 1202 may be configured to transmit the SRS, e.g., via the transceiver 1210.

The medium 1220 and/or memory 1204 may include an extended cyclic shift module 1224 that when implemented by the one or more processors 1202 configures the one or more processors 1202 to receive and determine the frequency tone level cyclic shift based on a symbol group level indicating a number of symbols associated to produce a cyclic shift structure, and an extended cyclic shift indicating a linear increase in phase rotation across tones in the symbols that are associated according to the symbol group level, which is used to generate the SRS, e.g., as discussed in reference to FIGS. 7-10. The symbol group level, for example, may be based on the number of symbols and the comb size.

The medium 1220 and/or memory 1204 may include an outer code module 1226 that when implemented by the one or more processors 1202 configures the one or more processors 1202 to receive and determine the symbol level code, e.g., based on the outer code indicating a multiplier applied to the SRS at the symbol level, e.g., as discussed in reference to FIGS. 8-10. For example, the one or more processors 1202 may be configured to include a common phase shift for at least a portion of the symbols associated according to the symbol group level in the outer code.

The methodologies described herein may be implemented by various means depending upon the application. For example, these methodologies may be implemented in hardware, firmware, software, or any combination thereof. For a hardware implementation, the one or more processors 1202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1220 or memory 1204 that is connected to and executed by the one or more processors 1202. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1208 on a non-transitory computer readable medium, such as medium 1220 and/or memory 1204. Examples include computer readable media encoded with a data structure and computer readable media encoded with a computer program code 1208. For example, the non-transitory computer readable medium including program code 1208 stored thereon may include program code 1208 to support SRS configured with frequency tone level cyclic shift and/or symbol level code, e.g., using symbol group level and an extended cyclic shift, an outer code or a combination thereof in a manner consistent with disclosed embodiments. Non-transitory computer readable medium 1220 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1208 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1220, instructions and/or data may be provided as signals on transmission media included in a communication apparatus. For example, a communication apparatus may include a transceiver 1210 having signals indicative of instructions and data. The instructions and data are configured to cause one or more processors to implement the functions outlined in the claims. That is, the communication apparatus includes transmission media with signals indicative of information to perform disclosed functions.

Memory 1204 may represent any data storage mechanism. Memory 1204 may include, for example, a primary memory and/or a secondary memory. Primary memory may include, for example, a random access memory, read only memory, etc. While illustrated in this example as being separate from one or more processors 1202, it should be understood that all or part of a primary memory may be provided within or otherwise co-located/coupled with the one or more processors 1202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1220. As such, in certain example implementations, the methods and/or apparatuses presented herein may take the form in whole or part of a computer readable medium 1220 that may include computer implementable program code 1208 stored thereon, which if executed by one or more processors 1202 may be operatively enabled to perform all or portions of the example operations as described herein. Computer readable medium 1220 may be a part of memory 1204.

Figure 13:
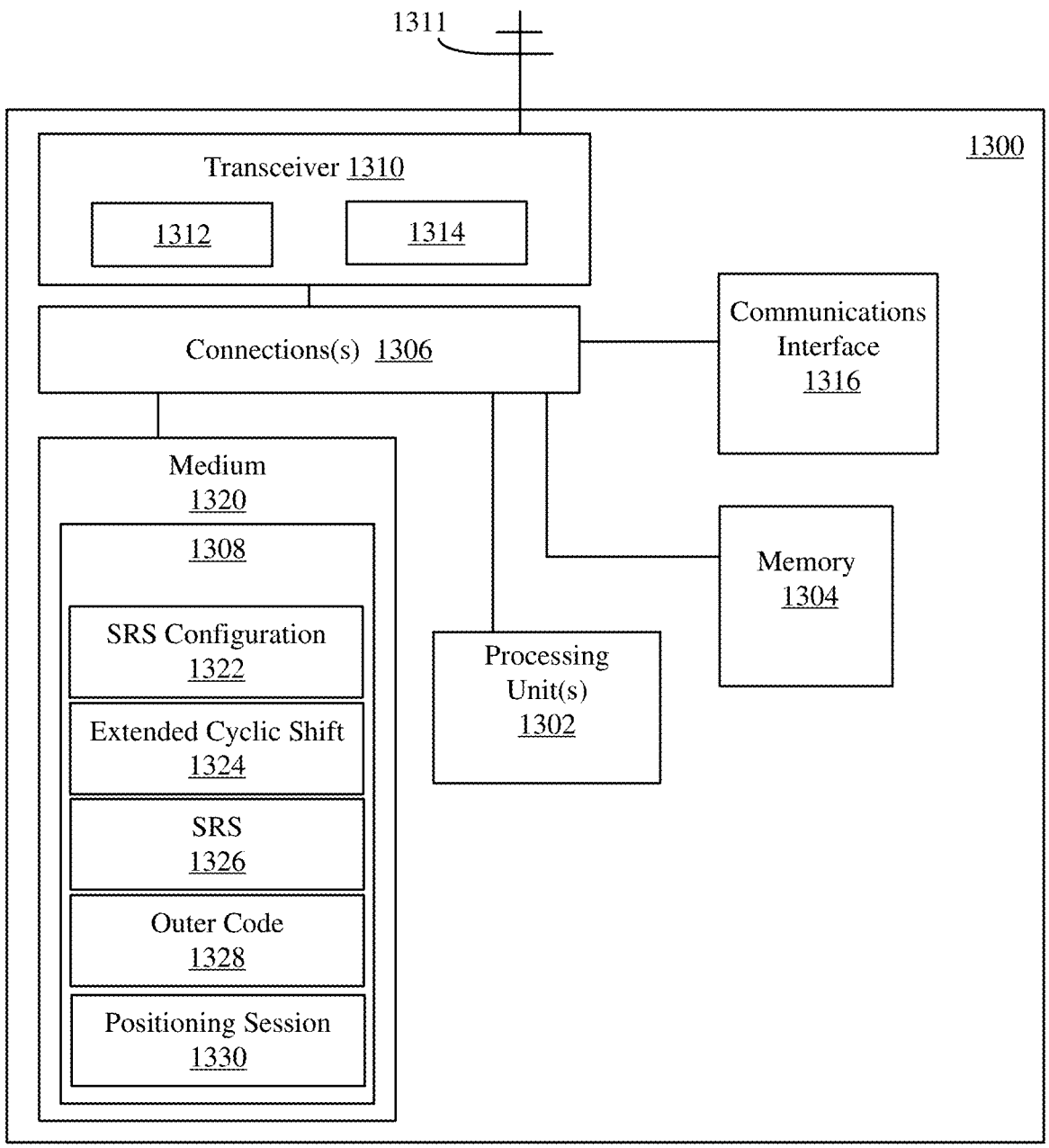
FIG. 13 shows a schematic block diagram illustrating certain exemplary features of a base station enabled to support configuration of SRS for frequency tone level cyclic shift and/or symbol level code.

FIG. 13 shows a schematic block diagram illustrating certain exemplary features of a base station 1300, e.g., base station 102 in FIG. 1, enabled to support configuration of SRS for frequency tone level cyclic shift and/or symbol level code, e.g., using symbol group level and an extended cyclic shift, an outer code or a combination thereof, as described herein, e.g., in FIGS. 7-11. The base station 1300 may be an eNB or gNB. The base station 1300 may be configured to perform the process flow shown in FIG. 15. Base station 1300 may, for example, include one or more processors 1302, memory 1304, an external interface, which may include a transceiver 1310 (e.g., wireless network interface) and a communications interface 1316 (e.g., wireline or wireless network interface to other base stations and/or entities in the core network such as a location server), which may be operatively coupled with one or more connections 1306 (e.g., buses, lines, fibers, links, etc.) to non-transitory computer readable medium 1320 and memory 1304. The base station 1300 may further include additional items, which are not shown, such as a user interface that may include e.g., a display, a keypad or other input device, such as virtual keypad on the display, through which a user may interface with the base station. In certain example implementations, all or part of base station 1300 may take the form of a chipset, and/or the like. Transceiver 1310 may, for example, include a transmitter 1312 enabled to transmit one or more signals over one or more types of wireless communication networks and a receiver 1314 to receive one or more signals transmitted over the one or more types of wireless communication networks. The communications interface 1316 may be a wired or wireless interface capable of connecting to other base stations in the RAN or network entities, such as a location server 172 shown in FIG. 1.

In some embodiments, base station 1300 may include antenna 1311, which may be internal or external. Antenna 1311 may be used to transmit and/or receive signals processed by transceiver 1310. In some embodiments, antenna 1311 may be coupled to transceiver 1310. In some embodiments, measurements of signals received (transmitted) by base station 1300 may be performed at the point of connection of the antenna 1311 and transceiver 1310. For example, the measurement point of reference for received (transmitted) RF signal measurements may be an input (output) terminal of the receiver 1314 (transmitter 1312) and an output (input) terminal of the antenna 1311. In a base station 1300 with multiple antennas 1311 or antenna arrays, the antenna connector may be viewed as a virtual point representing the aggregate output (input) of multiple antennas. In some embodiments, base station 1300 may measure received signals including signal strength and TOA measurements and the raw measurements may be processed by the one or more processors 1302.

The one or more processors 1302 may be implemented using a combination of hardware, firmware, and software. For example, the one or more processors 1302 may be configured to perform the functions discussed herein by implementing one or more instructions or program code 1308 on a non-transitory computer readable medium, such as medium 1320 and/or memory 1304. In some embodiments, the one or more processors 1302 may represent one or more circuits configurable to perform at least a portion of a data signal computing procedure or process related to the operation of base station 1300.

The medium 1320 and/or memory 1304 may store instructions or program code 1308 that contain executable code or software instructions that when executed by the one or more processors 1302 cause the one or more processors 1302 to operate as a special purpose computer programmed to perform the techniques disclosed herein. As illustrated in base station 1300, the medium 1320 and/or memory 1304 may include one or more components or modules that may be implemented by the one or more processors 1302 to perform the methodologies described herein. While the components or modules are illustrated as software in medium 1320 that is executable by the one or more processors 1302, it should be understood that the components or modules may be stored in memory 1304 or may be dedicated hardware either in the one or more processors 1302 or off the processors. A number of software modules and data tables may reside in the medium 1320 and/or memory 1304 and be utilized by the one or more processors 1302 in order to manage both communications and the functionality described herein. It should be appreciated that the organization of the contents of the medium 1320 and/or memory 1304 as shown in base station 1300 is merely exemplary, and as such the functionality of the modules and/or data structures may be combined, separated, and/or be structured in different ways depending upon the implementation of the base station 1300.

The medium 1320 and/or memory 1304 may include an SRS configuration module 1322 that when implemented by the one or more processors 1302 configures the one or more processors 1302 to generate the SRS configuration for the UE, e.g., as discussed in FIGS. 7-10. For example, the one or more processors 1302 may be configured to generate the SRS configuration based on a symbol group level indicating a number of symbols associated to produce a cyclic shift structure, and an extended cyclic shift indicating a linear increase in phase rotation across tones in the symbols that are associated according to the symbol group level, as well as an outer code indicating a multiplier applied to the SRS at the symbol level. The one or more processors 1302 may be configured to generate the SRS configuration with parameters, such as bandwidth, a number of symbols and a comb size. The one or more processors 1302 may be configured to transmit the SRS configuration, e.g., via the transceiver 1310.

The medium 1320 and/or memory 1304 may include an extended cyclic shift module 1324 that when implemented by the one or more processors 1302 configures the one or more processors 1302 to configure the frequency tone level cyclic shift based on a symbol group level indicating a number of symbols associated to produce a cyclic shift structure, and an extended cyclic shift indicating a linear increase in phase rotation across tones in the symbols that are associated to the symbol group level, which is used to configure the SRS, e.g., as discussed in reference to FIGS. 7-10. The symbol group level, for example, may be based on the number of symbols and the comb size.

The medium 1320 and/or memory 1304 may include an SRS module 1326 that when implemented by the one or more processors 1302 configures the one or more processors 1302 to receive SRS from the UE, via the transceiver 1310, and to process the SRS according to the SRS configuration, including the symbol group level, the extended cyclic shift, the outer code, the bandwidth, the number of symbols and the comb size.

The medium 1320 and/or memory 1304 may include an outer code module 1328 that when implemented by the one or more processors 1302 configures the one or more processors 1302 to generate the symbol level code, e.g., the outer code indicating a multiplier applied to the SRS at the symbol level, e.g., as discussed in reference to FIGS. 8-10. For example, the one or more processors 1302 may be configured to include a common phase shift for at least a portion of the symbols that are associated according to the symbol group level in the outer code.

The medium 1320 and/or memory 1304 may include a positioning session module 1330 that when implemented by the one or more processors 1302 configures the one or more processors 1302 to engage in a positioning session for the UE. For example, the one or more processors 1302 may be configured transmit and receive LLP messages for the UE 104 and location server 172 to engage in a positioning session. The one or more processors 1302 may be configured to transmit SRS configuration to the UE and to perform positioning measurements for SRS received from the UE. The one or more processors 1302 may be configured to transmit positioning measurements to a network entity, such as a location server or the UE via the transceiver 1310 or communications interface 1316.

The methodologies described herein may be implemented by various means depending upon the application. For example, these methodologies may be implemented in hardware, firmware, software, or any combination thereof. For a hardware implementation, the one or more processors 1302 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1320 or memory 1304 that is connected to and executed by the one or more processors 1302. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1308 on a non-transitory computer readable medium, such as medium 1320 and/or memory 1304. Examples include computer readable media encoded with a data structure and computer readable media encoded with a computer program code 1308. For example, the non-transitory computer readable medium including program code 1308 stored thereon may include program code 1308 to support configuration of SRS with frequency tone level cyclic shift and/or symbol level code, e.g., using symbol group level and an extended cyclic shift, an outer code or a combination thereof in a manner consistent with disclosed embodiments. Non-transitory computer readable medium 1320 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1308 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1320, instructions and/or data may be provided as signals on transmission media included in a communication apparatus. For example, a communication apparatus may include a transceiver 1310 having signals indicative of instructions and data. The instructions and data are configured to cause one or more processors to implement the functions outlined in the claims. That is, the communication apparatus includes transmission media with signals indicative of information to perform disclosed functions.

Memory 1304 may represent any data storage mechanism. Memory 1304 may include, for example, a primary memory and/or a secondary memory. Primary memory may include, for example, a random access memory, read only memory, etc. While illustrated in this example as being separate from one or more processors 1302, it should be understood that all or part of a primary memory may be provided within or otherwise co-located/coupled with the one or more processors 1302. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1320. As such, in certain example implementations, the methods and/or apparatuses presented herein may take the form in whole or part of a computer readable medium 1320 that may include computer implementable program code 1308 stored thereon, which if executed by one or more processors 1302 may be operatively enabled to perform all or portions of the example operations as described herein. Computer readable medium 1320 may be a part of memory 1304.

Figure 14:
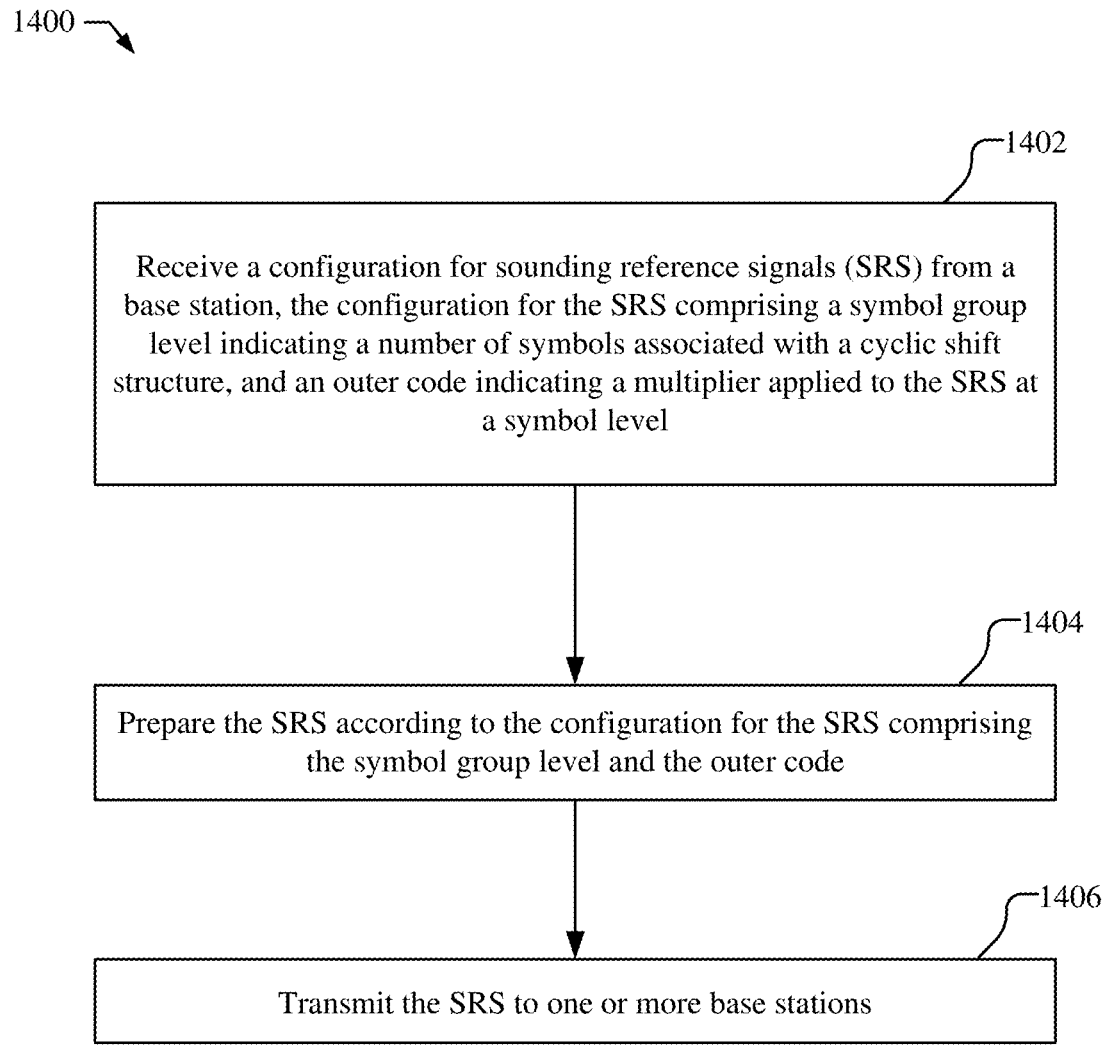
FIG. 14 shows a flowchart for an exemplary method for supporting wireless transmissions by UE in a wireless network performed by the UE.

FIG. 14 shows a flowchart for an exemplary process 1400 for supporting wireless transmissions by a user equipment (UE) in a wireless network performed by the UE, such as UE 104, in a manner consistent with disclosed implementation.

At block 1402, the UE receives a configuration for sounding reference signals (SRS) from a base station, the configuration for the SRS comprising a symbol group level indicating a number of symbols associated with a cyclic shift structure, and an outer code indicating a multiplier applied to the SRS at a symbol level, e.g., as discussed at stage 4a in FIG. 11. A means for receiving a configuration for sounding reference signals (SRS) from a base station, the configuration for the SRS comprising a symbol group level indicating a number of symbols associated with a cyclic shift structure, and an outer code indicating a multiplier applied to the SRS at a symbol level may include the wireless transceiver 1210 and one or more processors 1202 with dedicated hardware or implementing executable code or software instructions in memory 1204 and/or medium 1220, such as the UL SRS module 1222 and the extended cyclic shift module 1224 and outer code module 1226, in UE 1200 shown in FIG. 12.

At block 1404, the UE may prepare the SRS according to the configuration for the SRS comprising the symbol group level and the outer code, e.g., as discussed at stage 8a of FIG. 11, and discussed in reference to FIGS. 7-10. A means for preparing the SRS according to the configuration for the SRS comprising the symbol group level and the outer code may include the wireless transceiver 1010 and one or more processors 1202 with dedicated hardware or implementing executable code or software instructions in memory 1204 and/or medium 1220, such as the extended cyclic shift module 1224, in UE 1200 shown in FIG. 12.

At block 1406, the UE may transmit the SRS to one or more base stations, e.g., as discussed at stage 8a of FIG. 11. For example, the SRS may be transmitted to the one or more base stations for channel estimation or positioning. A means for transmitting the SRS to one or more base stations may include the wireless transceiver 1010 and one or more processors 1202 with dedicated hardware or implementing executable code or software instructions in memory 1204 and/or medium 1220, such as the UL SRS module 1222, in UE 1200 shown in FIG. 12.

In one implementation, the outer code may increase multiplexing capacity by serving as an identifier for the UE relative to other UEs that transmit SRS using a same symbol group level, but with a different outer code. For example, the outer code may comprise a set or subset of orthogonal basis comprising one of a Fourier basis or a Hadamard basis.

In one implementation, the configuration for the SRS may further comprise an extended cyclic shift indicating a linear increase in phase rotation across tones in the symbols associated with the symbol group level, wherein preparing the SRS according to the configuration for the SRS further comprises the extended cyclic shift. A combination of the extended cyclic shift and the outer code may serve as an identifier for the UE. In one implementation, a common phase shift for at least a portion of the symbols associated with the symbol group level is included in the outer code. The configuration for the SRS may further comprise a bandwidth and a comb size. For example, a maximum number of extended cyclic shifts is based on the number of symbols and the comb size, and the symbol group level. For example, the symbol group level may be based on the number of symbols and the comb size. In one example, when the number of symbols is 2, the symbol group level indicates that 2 symbols are associated to produce a single-symbol cyclic shift structure or that 2 symbols are not associated to produce the cyclic shift structure. In another example, when the number of symbols is 4 and the comb size is 4, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure. In another example, when the number of symbols is 4 and the comb size is 2, the symbol group level indicates that 4 symbols are associated to produce a two symbol cyclic shift structure, or that 4 symbols are not associated to produce the cyclic shift structure. In one example, when the number of symbols is 4 and the comb size is 8, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure. In one example, when the number of symbols is 8 and the comb size is 4, the symbol group level indicates that 8 symbols are associated to produce a two symbol cyclic shift structure, 8 symbols are associated to produce a four symbol cyclic shift structure, or that 8 symbols are not associated to produce the cyclic shift structure. In one example, when the number of symbols is 8 and the comb size is 8, the symbol group level indicates that 8 symbols are associated to produce a single-symbol cyclic shift structure, 8 symbols are associated to produce a two symbol cyclic shift structure, 8 symbols are associated to produce a four symbol cyclic shift structure, or that 8 symbols are not associated to produce the cyclic shift structure. In one example, when the number of symbols is 12 and the comb size is 4 or 8, the symbol group level indicates that 12 symbols are associated to produce a three symbol cyclic shift structure, 12 symbols are associated to produce a six symbol cyclic shift structure, or that 12 symbols are not associated to produce the cyclic shift structure.

Figure 15:
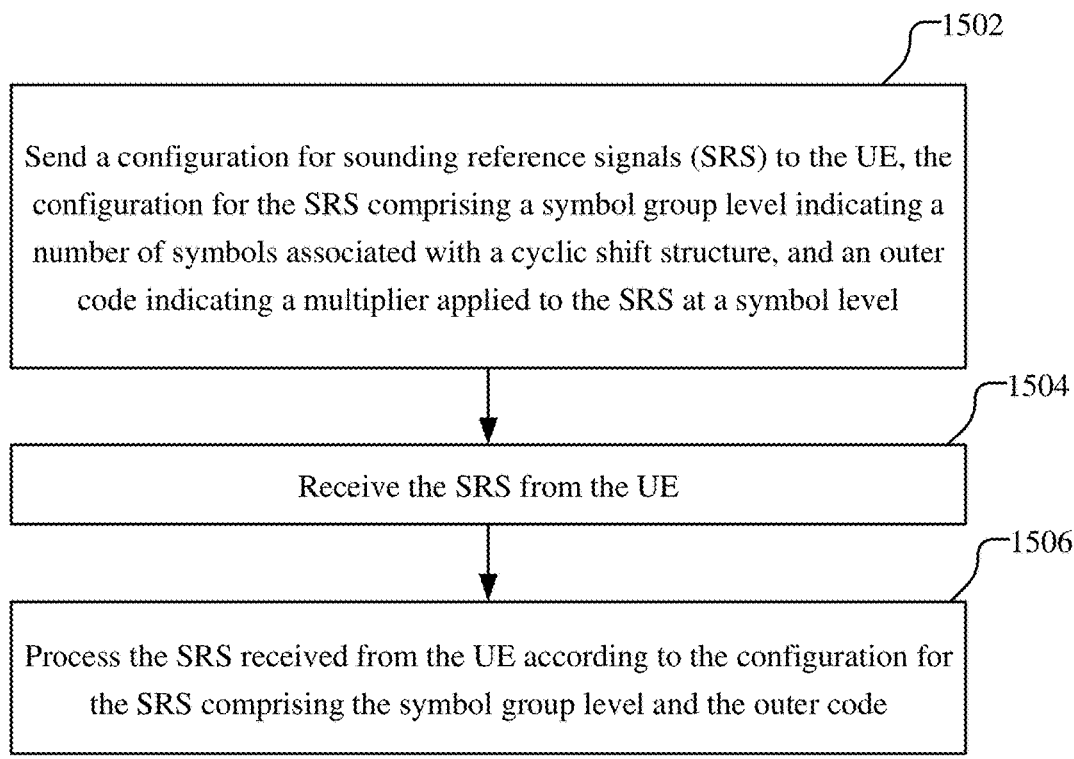
FIG. 15 shows a flowchart for an exemplary method for supporting wireless transmissions by UE in a wireless network performed by a serving base station.

FIG. 15 shows a flowchart for an exemplary process 1500 for supporting wireless transmissions by a user equipment (UE) in a wireless network performed by a serving base station, such as gNB 102-1, for the UE, in a manner consistent with disclosed implementation.

At block 1502, the base station sends a configuration for sounding reference signals (SRS) to the UE, the configuration for the SRS comprising a symbol group level indicating a number of symbols associated with a cyclic shift structure, and an outer code indicating a multiplier applied to the SRS at a symbol level, e.g., as discussed at stage 4a in FIG. 11. A means for sending a configuration for sounding reference signals (SRS) to the UE, the configuration for the SRS comprising a symbol group level indicating a number of symbols associated with a cyclic shift structure, and an outer code indicating a multiplier applied to the SRS at a symbol level may include, e.g., the wireless transceiver 1310 and one or more processors 1302 with dedicated hardware or implementing executable code or software instructions in memory 1304 and/or medium 1320, such as the SRS configuration module 1322 and the extended cyclic shift module 1324, in base station 1300 shown in FIG. 13.

At block 1504, the base station receives the SRS from the UE, e.g., as discussed at stage 8a in FIG. 11. A means for receiving the SRS from the UE may include, e.g., the wireless transceiver 1310 and one or more processors 1302 with dedicated hardware or implementing executable code or software instructions in memory 1304 and/or medium 1320, in base station 1300 shown in FIG. 13.

At block 1506, the base station may process the SRS received from the UE according to the configuration for the SRS comprising the symbol group level and the outer code, e.g., as discussed at stage 8a in FIG. 11 and discussed in reference to FIGS. 7-10. A means for processing the SRS received from the UE according to the configuration for the SRS comprising the symbol group level and the outer code may include, e.g., the one or more processors 1302 with dedicated hardware or implementing executable code or software instructions in memory 1304 and/or medium 1320, such as the SRS module 1326 and the extended cyclic shift module 1324, and the outer code module 1328, in base station 1300 shown in FIG. 13.

In one implementation, the outer code may increase multiplexing capacity by serving as an identifier for the UE relative to other UEs that transmit SRS using a same symbol group level, but with a different outer code. For example, the outer code may comprise a set or subset of orthogonal basis comprising one of a Fourier basis or a Hadamard basis.

In one implementation, the configuration for the SRS may further comprise an extended cyclic shift indicating a linear increase in phase rotation across tones in the symbols associated with the symbol group level, wherein processing the SRS according to the configuration for the SRS further comprises the extended cyclic shift. A combination of the extended cyclic shift and the outer code serves as an identifier for the UE. In one implementation, a common phase shift for at least a portion of the symbols associated with the symbol group level is included in the outer code. The configuration for the SRS may further comprise a bandwidth and a comb size. For example, a maximum number of extended cyclic shifts is based on the number of symbols and the comb size, and the symbol group level. For example, the symbol group level is based on the number of symbols and the comb size. In one example, when the number of symbols is 2, the symbol group level indicates that 2 symbols are associated to produce a single-symbol cyclic shift structure or that 2 symbols are not associated to produce the cyclic shift structure. In one example, when the number of symbols is 4 and the comb size is 4, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure. In one example, when the number of symbols is 4 and the comb size is 2, the symbol group level indicates that 4 symbols are associated to produce a two symbol cyclic shift structure, or that 4 symbols are not associated to produce the cyclic shift structure. In one example, when the number of symbols is 4 and the comb size is 8, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure. In one example, when the number of symbols is 8 and the comb size is 4, the symbol group level indicates that 8 symbols are associated to produce a two symbol cyclic shift structure, 8 symbols are associated to produce a four symbol cyclic shift structure, or that 8 symbols are not associated to produce the cyclic shift structure. In one example, when the number of symbols is 8 and the comb size is 8, the symbol group level indicates that 8 symbols are associated to produce a single-symbol cyclic shift structure, 8 symbols are associated to produce a two symbol cyclic shift structure, 8 symbols are associated to produce a four symbol cyclic shift structure, or that 8 symbols are not associated to produce the cyclic shift structure. In one example, when the number of symbols is 12 and the comb size is 4 or 8, the symbol group level indicates that 12 symbols are associated to produce a three symbol cyclic shift structure, 12 symbols are associated to produce a six symbol cyclic shift structure, or that 12 symbols are not associated to produce the cyclic shift structure.

In one implementation, the SRS received from the UE may be for channel estimation. In another implementation, the method may further include generating positioning measurements from the SRS received the UE, e.g., as discussed at stage 8b in FIG. 11. A means for generating positioning measurements from the SRS received the UE may include, e.g., the one or more processors 1302 with dedicated hardware or implementing executable code or software instructions in memory 1304 and/or medium 1320, such as the positioning session module 1330, in base station 1300 shown in FIG. 13. The base station may send the positioning measurements to a network entity for position estimation of the UE, e.g., as discussed at stage 8b in FIG. 11. A means for sending the positioning measurements to a network entity for position estimation of the UE may include, e.g., the wireless transceiver 1310 and one or more processors 1302 with dedicated hardware or implementing executable code or software instructions in memory 1304 and/or medium 1320, such as the positioning session module 1330, in base station 1300 shown in FIG. 13.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a user equipment (UE) for supporting wireless transmissions by the UE in a wireless network, the method comprising: receiving a configuration for sounding reference signals (SRS) from a base station, the configuration for the SRS comprising a symbol group level indicating a number of symbols associated with a cyclic shift structure, and an outer code indicating a multiplier applied to the SRS at a symbol level; preparing the SRS according to the configuration for the SRS comprising the symbol group level and the outer code; and transmitting the SRS to one or more base stations.

Clause 2. The method of clause 1, wherein the outer code increases multiplexing capacity by serving as an identifier for the UE relative to other UEs that transmit SRS using a same symbol group level, but with a different outer code.

Clause 3. The method of any of clauses 1-2, wherein the outer code comprises a set or subset of orthogonal basis comprising one of a Fourier basis or a Hadamard basis.

Clause 4. The method of any of clauses 1-3, wherein the configuration for the SRS further comprises an extended cyclic shift indicating a linear increase in phase rotation across tones in symbols associated with the symbol group level, wherein preparing the SRS according to the configuration for the SRS further comprises the extended cyclic shift.

Clause 5. The method of clause 4, wherein a combination of the extended cyclic shift and the outer code serves as an identifier for the UE.

Clause 6. The method of any of clauses 4-5, wherein a common phase shift for at least a portion of the symbols associated with the symbol group level is included in the outer code.

Clause 7. The method of any of clauses 4-6, wherein the configuration for the SRS further comprises a bandwidth and a comb size.

Clause 8. The method of clause 7, wherein a maximum number of extended cyclic shifts is based on the number of symbols and the comb size, and the symbol group level.

Clause 9. The method of any of clauses 7-8, wherein the symbol group level is based on the number of symbols and the comb size.

Clause 10. The method of clause 7, wherein when the number of symbols is 2, the symbol group level indicates that 2 symbols are associated to produce a single-symbol cyclic shift structure or that 2 symbols are not associated to produce the cyclic shift structure.

Clause 11. The method of clause 7, wherein when the number of symbols is 4 and the comb size is 4, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 12. The method of clause 7, wherein when the number of symbols is 4 and the comb size is 2, the symbol group level indicates that 4 symbols are associated to produce a two symbol cyclic shift structure, or that 4 symbols are not associated to produce the cyclic shift structure.

Clause 13. The method of clause 7, wherein when the number of symbols is 4 and the comb size is 8, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 14. The method of clause 7, wherein when the number of symbols is 8 and the comb size is 4, the symbol group level indicates that 8 symbols are associated to produce a two symbol cyclic shift structure, 8 symbols are associated to produce a four symbol cyclic shift structure, or that 8 symbols are not associated to produce the cyclic shift structure.

Clause 15. The method of clause 7, wherein when the number of symbols is 8 and the comb size is 8, the symbol group level indicates that 8 symbols are associated to produce a single-symbol cyclic shift structure, 8 symbols are associated to produce a two symbol cyclic shift structure, 8 symbols are associated to produce a four symbol cyclic shift structure, or that 8 symbols are not associated to produce the cyclic shift structure.

Clause 16. The method of clause 7, wherein when the number of symbols is 12 and the comb size is 4 or 8, the symbol group level indicates that 12 symbols are associated to produce a three symbol cyclic shift structure, 12 symbols are associated to produce a six symbol cyclic shift structure, or that 12 symbols are not associated to produce the cyclic shift structure.

Clause 17. The method of any of clauses 1-16, wherein the SRS are transmitted to the one or more base stations for channel estimation or positioning.

Clause 18. A user equipment (UE) configured for supporting wireless transmissions by the UE in a wireless network, comprising: a wireless transceiver configured to wirelessly communicate with entities in the wireless network; at least one memory; at least one processor coupled to the wireless transceiver and the at least one memory, wherein the at least one processor is configured to: receive, via the wireless transceiver, a configuration for sounding reference signals (SRS) from a base station, the configuration for the SRS comprising a symbol group level indicating a number of symbols associated with a cyclic shift structure, and an outer code indicating a multiplier applied to the SRS at a symbol level; prepare the SRS according to the configuration for the SRS comprising the symbol group level and the outer code; and transmit, via the wireless transceiver, the SRS to one or more base stations.

Clause 19. The UE of clause 18, wherein the outer code increases multiplexing capacity by serving as an identifier for the UE relative to other UEs that transmit SRS using a same symbol group level, but with a different outer code.

Clause 20. The UE of any of clauses 18-19, wherein the outer code comprises a set or subset of orthogonal basis comprising one of a Fourier basis or a Hadamard basis.

Clause 21. The UE of any of clauses 18-20, wherein the configuration for the SRS further comprises an extended cyclic shift indicating a linear increase in phase rotation across tones in symbols associated with the symbol group level, wherein preparing the SRS according to the configuration for the SRS further comprises the extended cyclic shift.

Clause 22. The UE of clause 21, wherein a combination of the extended cyclic shift and the outer code serves as an identifier for the UE.

Clause 23. The UE of any of clauses 21-22, wherein a common phase shift for at least a portion of the symbols associated with the symbol group level is included in the outer code.

Clause 24. The UE of any of clauses 21-23, wherein the configuration for the SRS further comprises a bandwidth and a comb size.

Clause 25. The UE of clause 24, wherein a maximum number of extended cyclic shifts is based on the number of symbols and the comb size, and the symbol group level.

Clause 26. The UE of any of clauses 24-25, wherein the symbol group level is based on the number of symbols and the comb size.

Clause 27. The UE of clause 24, wherein when the number of symbols is 2, the symbol group level indicates that 2 symbols are associated to produce a single-symbol cyclic shift structure or that 2 symbols are not associated to produce the cyclic shift structure.

Clause 28. The UE of clause 24, wherein when the number of symbols is 4 and the comb size is 4, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 29. The UE of clause 24, wherein when the number of symbols is 4 and the comb size is 2, the symbol group level indicates that 4 symbols are associated to produce a two symbol cyclic shift structure, or that 4 symbols are not associated to produce the cyclic shift structure.

Clause 30. The UE of clause 24, wherein when the number of symbols is 4 and the comb size is 8, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 31. The UE of clause 24, wherein when the number of symbols is 8 and the comb size is 4, the symbol group level indicates that 8 symbols are associated to produce a two symbol cyclic shift structure, 8 symbols are associated to produce a four symbol cyclic shift structure, or that 8 symbols are not associated to produce the cyclic shift structure.

Clause 32. The UE of clause 24, wherein when the number of symbols is 8 and the comb size is 8, the symbol group level indicates that 8 symbols are associated to produce a single-symbol cyclic shift structure, 8 symbols are associated to produce a two symbol cyclic shift structure, 8 symbols are associated to produce a four symbol cyclic shift structure, or that 8 symbols are not associated to produce the cyclic shift structure.

Clause 33. The UE of clause 24, wherein when the number of symbols is 12 and the comb size is 4 or 8, the symbol group level indicates that 12 symbols are associated to produce a three symbol cyclic shift structure, 12 symbols are associated to produce a six symbol cyclic shift structure, or that 12 symbols are not associated to produce the cyclic shift structure.

Clause 34. The UE of any of clauses 18-33, wherein the SRS are transmitted to the one or more base stations for channel estimation or positioning.

Clause 35. A user equipment (UE) configured for supporting wireless transmissions by the UE in a wireless network, comprising: means for receiving a configuration for sounding reference signals (SRS) from a base station, the configuration for the SRS comprising a symbol group level indicating a number of symbols associated with a cyclic shift structure, and an outer code indicating a multiplier applied to the SRS at a symbol level; means for preparing the SRS according to the configuration for the SRS comprising the symbol group level and the outer code; and means for transmitting the SRS to one or more base stations.

Clause 36. The UE of clause 35, wherein the outer code increases multiplexing capacity by serving as an identifier for the UE relative to other UEs that transmit SRS using a same symbol group level, but with a different outer code.

Clause 37. The UE of any of clauses 35-36, wherein the outer code comprises a set or subset of orthogonal basis comprising one of a Fourier basis or a Hadamard basis.

Clause 38. The UE of any of clauses 35-37, wherein the configuration for the SRS further comprises an extended cyclic shift indicating a linear increase in phase rotation across tones in symbols associated with the symbol group level, wherein preparing the SRS according to the configuration for the SRS further comprises the extended cyclic shift.

Clause 39. The UE of clause 38, wherein a combination of the extended cyclic shift and the outer code serves as an identifier for the UE.

Clause 40. The UE of any of clauses 38-39, wherein a common phase shift for at least a portion of the symbols associated with the symbol group level is included in the outer code.

Clause 41. The UE of any of clauses 38-40, wherein the configuration for the SRS further comprises a bandwidth and a comb size.

Clause 42. The UE of clause 41, wherein a maximum number of extended cyclic shifts is based on the number of symbols and the comb size, and the symbol group level.

Clause 43. The UE of any of clauses 41-42, wherein the symbol group level is based on the number of symbols and the comb size.

Clause 44. The UE of clause 41, wherein when the number of symbols is 2, the symbol group level indicates that 2 symbols are associated to produce a single-symbol cyclic shift structure or that 2 symbols are not associated to produce the cyclic shift structure.

Clause 45. The UE of clause 41, wherein when the number of symbols is 4 and the comb size is 4, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 46. The UE of clause 41, wherein when the number of symbols is 4 and the comb size is 2, the symbol group level indicates that 4 symbols are associated to produce a two symbol cyclic shift structure, or that 4 symbols are not associated to produce the cyclic shift structure.

Clause 47. The UE of clause 41, wherein when the number of symbols is 4 and the comb size is 8, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 48. The UE of clause 41, wherein when the number of symbols is 8 and the comb size is 4, the symbol group level indicates that 8 symbols are associated to produce a two symbol cyclic shift structure, 8 symbols are associated to produce a four symbol cyclic shift structure, or that 8 symbols are not associated to produce the cyclic shift structure.

Clause 49. The UE of clause 41, wherein when the number of symbols is 8 and the comb size is 8, the symbol group level indicates that 8 symbols are associated to produce a single-symbol cyclic shift structure, 8 symbols are associated to produce a two symbol cyclic shift structure, 8 symbols are associated to produce a four symbol cyclic shift structure, or that 8 symbols are not associated to produce the cyclic shift structure.

Clause 50. The UE of clause 41, wherein when the number of symbols is 12 and the comb size is 4 or 8, the symbol group level indicates that 12 symbols are associated to produce a three symbol cyclic shift structure, 12 symbols are associated to produce a six symbol cyclic shift structure, or that 12 symbols are not associated to produce the cyclic shift structure.

Clause 51. The UE of any of clauses 35-50, wherein the SRS are transmitted to the one or more base stations for channel estimation or positioning.

Clause 52. A non-transitory computer-readable storage medium including program code stored thereon, the program code is operable to configure at least one processor in a user equipment (UE) configured for supporting wireless transmissions by the UE in a wireless network, the program code comprising instructions to: receive a configuration for sounding reference signals (SRS) from a base station, the configuration for the SRS comprising a symbol group level indicating a number of symbols associated with a cyclic shift structure, and an outer code indicating a multiplier applied to the SRS at a symbol level; prepare the SRS according to the configuration for the SRS comprising the symbol group level and the outer code; and transmit the SRS to one or more base stations.

Clause 53. The non-transitory computer-readable storage medium of clause 52, wherein the outer code increases multiplexing capacity by serving as an identifier for the UE relative to other UEs that transmit SRS using a same symbol group level, but with a different outer code.

Clause 54. The non-transitory computer-readable storage medium of any of clauses 52-53, wherein the outer code comprises a set or subset of orthogonal basis comprising one of a Fourier basis or a Hadamard basis.

Clause 55. The non-transitory computer-readable storage medium of any of clauses 52-54, wherein the configuration for the SRS further comprises an extended cyclic shift indicating a linear increase in phase rotation across tones in symbols associated with the symbol group level, wherein preparing the SRS according to the configuration for the SRS further comprises the extended cyclic shift.

Clause 56. The non-transitory computer-readable storage medium of clause 55, wherein a combination of the extended cyclic shift and the outer code serves as an identifier for the UE.

Clause 57. The non-transitory computer-readable storage medium of any of clauses 55-56, wherein a common phase shift for at least a portions of the symbols associated with the symbol group level is included in the outer code.

Clause 58. The non-transitory computer-readable storage medium of any of clauses 55-57, wherein the configuration for the SRS further comprises a bandwidth and a comb size.

Clause 59. The non-transitory computer-readable storage medium of clause 58, wherein a maximum number of extended cyclic shifts is based on the number of symbols and the comb size, and the symbol group level.

Clause 60. The non-transitory computer-readable storage medium of any of clauses 58-59, wherein the symbol group level is based on the number of symbols and the comb size.

Clause 61. The non-transitory computer-readable storage medium of clause 58, wherein when the number of symbols is 2, the symbol group level indicates that 2 symbols are associated to produce a single-symbol cyclic shift structure or that 2 symbols are not associated to produce the cyclic shift structure.

Clause 62. The non-transitory computer-readable storage medium of clause 58, wherein when the number of symbols is 4 and the comb size is 4, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 63. The non-transitory computer-readable storage medium of clause 58, wherein when the number of symbols is 4 and the comb size is 2, the symbol group level indicates that 4 symbols are associated to produce a two symbol cyclic shift structure, or that 4 symbols are not associated to produce the cyclic shift structure.

Clause 64. The non-transitory computer-readable storage medium of clause 58, wherein when the number of symbols is 4 and the comb size is 8, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 65. The non-transitory computer-readable storage medium of clause 58, wherein when the number of symbols is 8 and the comb size is 4, the symbol group level indicates that 8 symbols are associated to produce a two symbol cyclic shift structure, 8 symbols are associated to produce a four symbol cyclic shift structure, or that 8 symbols are not associated to produce the cyclic shift structure.

Clause 66. The non-transitory computer-readable storage medium of clause 58, wherein when the number of symbols is 8 and the comb size is 8, the symbol group level indicates that 8 symbols are associated to produce a single-symbol cyclic shift structure, 8 symbols are associated to produce a two symbol cyclic shift structure, 8 symbols are associated to produce a four symbol cyclic shift structure, or that 8 symbols are not associated to produce the cyclic shift structure.

Clause 67. The non-transitory computer-readable storage medium of clause 58, wherein when the number of symbols is 12 and the comb size is 4 or 8, the symbol group level indicates that 12 symbols are associated to produce a three symbol cyclic shift structure, 12 symbols are associated to produce a six symbol cyclic shift structure, or that 12 symbols are not associated to produce the cyclic shift structure.

Clause 68. The non-transitory computer-readable storage medium of any of clauses 52-67, wherein the SRS are transmitted to the one or more base stations for channel estimation or positioning.

Clause 69. A method performed by a serving base station for supporting wireless transmissions by a user equipment (UE) in a wireless network, the method comprising: sending a configuration for sounding reference signals (SRS) to the UE, the configuration for the SRS comprising a symbol group level indicating a number of symbols associated with a cyclic shift structure, and an outer code indicating a multiplier applied to the SRS at a symbol level; receiving the SRS from the UE; and processing the SRS received from the UE according to the configuration for the SRS comprising the symbol group level and the outer code.

Clause 70. The method of clause 69, wherein the outer code increases multiplexing capacity by serving as an identifier for the UE relative to other UEs that transmit SRS using a same symbol group level, but with a different outer code.

Clause 71. The method of any of clauses 69-70, wherein the outer code comprises a set or subset of orthogonal basis comprising one of a Fourier basis or a Hadamard basis.

Clause 72. The method of any of clauses 69-71, wherein the configuration for the SRS further comprises an extended cyclic shift indicating a linear increase in phase rotation across tones in symbols associated with the symbol group level, wherein processing the SRS according to the configuration for the SRS further comprises the extended cyclic shift.

Clause 73. The method of clause 72, wherein a combination of the extended cyclic shift and the outer code serves as an identifier for the UE.

Clause 74. The method of any of clauses 72-73, wherein a common phase shift for at least a portion of the symbols associated with the symbol group level is included in the outer code.

Clause 75. The method of any of clauses 72-74, wherein the configuration for the SRS further comprises a bandwidth and a comb size.

Clause 76. The method of clause 75, wherein a maximum number of extended cyclic shifts is based on the number of symbols and the comb size, and the symbol group level.

Clause 77. The method of any of clauses 75-76, wherein the symbol group level is based on the number of symbols and the comb size.

Clause 78. The method of clause 75, wherein when the number of symbols is 2, the symbol group level indicates that 2 symbols are associated to produce a single-symbol cyclic shift structure or that 2 symbols are not associated to produce the cyclic shift structure.

Clause 79. The method of clause 75, wherein when the number of symbols is 4 and the comb size is 4, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 80. The method of clause 75, wherein when the number of symbols is 4 and the comb size is 2, the symbol group level indicates that 4 symbols are associated to produce a two symbol cyclic shift structure, or that 4 symbols are not associated to produce the cyclic shift structure.

Clause 81. The method of clause 75, wherein when the number of symbols is 4 and the comb size is 8, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 82. The method of clause 75, wherein when the number of symbols is 8 and the comb size is 4, the symbol group level indicates that 8 symbols are associated to produce a two symbol cyclic shift structure, 8 symbols are associated to produce a four symbol cyclic shift structure, or that 8 symbols are not associated to produce the cyclic shift structure.

Clause 83. The method of clause 75, wherein when the number of symbols is 8 and the comb size is 8, the symbol group level indicates that 8 symbols are associated to produce a single-symbol cyclic shift structure, 8 symbols are associated to produce a two symbol cyclic shift structure, 8 symbols are associated to produce a four symbol cyclic shift structure, or that 8 symbols are not associated to produce the cyclic shift structure.

Clause 84. The method of clause 75, wherein when the number of symbols is 12 and the comb size is 4 or 8, the symbol group level indicates that 12 symbols are associated to produce a three symbol cyclic shift structure, 12 symbols are associated to produce a six symbol cyclic shift structure, or that 12 symbols are not associated to produce the cyclic shift structure.

Clause 85. The method of any of clauses 69-84, wherein the SRS received from the UE is for channel estimation.

Clause 86. The method of any of clauses 69-85, further comprising: generating positioning measurements from the SRS received the UE; sending the positioning measurements to a network entity for position estimation of the UE.

Clause 87. A base station configured for supporting wireless transmissions by a user equipment (UE) in a wireless network, the base station is a serving base station for the UE, comprising: an external interface configured to wirelessly communicate with entities in the wireless network; at least one memory; at least one processor coupled to the external interface and the at least one memory, wherein the at least one processor is configured to: send, via the external interface, a configuration for sounding reference signals (SRS) to the UE, the configuration for the SRS comprising a symbol group level indicating a number of symbols associated with a cyclic shift structure, and an outer code indicating a multiplier applied to the SRS at a symbol level; receive, via the external interface, the SRS from the UE; and process the SRS received from the UE according to the configuration for the SRS comprising the symbol group level and the outer code.

Clause 88. The base station of clause 87, wherein the outer code increases multiplexing capacity by serving as an identifier for the UE relative to other UEs that transmit SRS using a same symbol group level, but with a different outer code.

Clause 89. The base station of any of clauses 87-88, wherein the outer code comprises a set or subset of orthogonal basis comprising one of a Fourier basis or a Hadamard basis.

Clause 90. The base station of any of clauses 87-89, wherein the configuration for the SRS further comprises an extended cyclic shift indicating a linear increase in phase rotation across tones in symbols associated with the symbol group level, wherein processing the SRS according to the configuration for the SRS further comprises the extended cyclic shift.

Clause 91. The base station of clause 90, wherein a combination of the extended cyclic shift and the outer code serves as an identifier for the UE.

Clause 92. The base station of any of clauses 90-91, wherein a common phase shift for at least a portion of the symbols associated with the symbol group level is included in the outer code.

Clause 93. The base station of any of clauses 90-92, wherein the configuration for the SRS further comprises a bandwidth and a comb size.

Clause 94. The base station of clause 93, wherein a maximum number of extended cyclic shifts is based on the number of symbols and the comb size, and the symbol group level.

Clause 95. The base station of any of clauses 93-94, wherein the symbol group level is based on the number of symbols and the comb size.

Clause 96. The base station of clause 93, wherein when the number of symbols is 2, the symbol group level indicates that 2 symbols are associated to produce a single-symbol cyclic shift structure or that 2 symbols are not associated to produce the cyclic shift structure.

Clause 97. The base station of clause 93, wherein when the number of symbols is 4 and the comb size is 4, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 98. The base station of clause 93, wherein when the number of symbols is 4 and the comb size is 2, the symbol group level indicates that 4 symbols are associated to produce a two symbol cyclic shift structure, or that 4 symbols are not associated to produce the cyclic shift structure.

Clause 99. The base station of clause 93, wherein when the number of symbols is 4 and the comb size is 8, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 100. The base station of clause 93, wherein when the number of symbols is 8 and the comb size is 4, the symbol group level indicates that 8 symbols are associated to produce a two symbol cyclic shift structure, 8 symbols are associated to produce a four symbol cyclic shift structure, or that 8 symbols are not associated to produce the cyclic shift structure.

Clause 101. The base station of clause 93, wherein the number of symbols is 8 and the comb size is 8, the symbol group level indicates that 8 symbols are associated to produce a single-symbol cyclic shift structure, 8 symbols are associated to produce a two symbol cyclic shift structure, 8 symbols are associated to produce a four symbol cyclic shift structure, or that 8 symbols are not associated to produce the cyclic shift structure.

Clause 102. The base station of clause 93, wherein when the number of symbols is 12 and the comb size is 4 or 8, the symbol group level indicates that 12 symbols are associated to produce a three symbol cyclic shift structure, 12 symbols are associated to produce a six symbol cyclic shift structure, or that 12 symbols are not associated to produce the cyclic shift structure.

Clause 103. The base station of any of clauses 87-102, wherein the SRS received from the UE is for channel estimation.

Clause 104. The base station of any of clauses 87-103, wherein the at least one processor is further configured to: generate positioning measurements from the SRS received the UE; send, via the external interface, the positioning measurements to a network entity for position estimation of the UE.

Clause 105. A serving base station for supporting wireless transmissions by a user equipment (UE) in a wireless network, comprising: means for sending a configuration for sounding reference signals (SRS) to the UE, the configuration for the SRS comprising a symbol group level indicating a number of symbols associated with a cyclic shift structure, and an outer code indicating a multiplier applied to the SRS at a symbol level; means for receiving the SRS from the UE; and means for processing the SRS received from the UE according to the configuration for the SRS comprising the symbol group level and the outer code.

Clause 106. The serving base station of clause 105, wherein the outer code increases multiplexing capacity by serving as an identifier for the UE relative to other UEs that transmit SRS using a same symbol group level, but with a different outer code.

Clause 107. The serving base station of any of clauses 105-106, wherein the outer code comprises a set or subset of orthogonal basis comprising one of a Fourier basis or a Hadamard basis.

Clause 108. The serving base station of any of clauses 105-107, wherein the configuration for the SRS further comprises an extended cyclic shift indicating a linear increase in phase rotation across tones in symbols associated with the symbol group level, wherein processing the SRS according to the configuration for the SRS further comprises the extended cyclic shift.

Clause 109. The serving base station of clause 108, wherein a combination of the extended cyclic shift and the outer code serves as an identifier for the UE.

Clause 110. The serving base station of any of clauses 108-109, wherein a common phase shift for at least a portion of the symbols associated with the symbol group level is included in the outer code.

Clause 111. The serving base station of any of clauses 108-110, wherein the configuration for the SRS further comprises a bandwidth and a comb size.

Clause 112. The serving base station of clause 111, wherein a maximum number of extended cyclic shifts is based on the number of symbols and the comb size, and the symbol group level.

Clause 113. The serving base station of any of clauses 111-112, wherein the symbol group level is based on the number of symbols and the comb size.

Clause 114. The serving base station of clause 111, wherein when the number of symbols is 2, the symbol group level indicates that 2 symbols are associated to produce a single-symbol cyclic shift structure or that 2 symbols are not associated to produce the cyclic shift structure.

Clause 115. The serving base station of clause 111, wherein when the number of symbols is 4 and the comb size is 4, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 116. The serving base station of clause 111, wherein when the number of symbols is 4 and the comb size is 2, the symbol group level indicates that 4 symbols are associated to produce a two symbol cyclic shift structure, or that 4 symbols are not associated to produce the cyclic shift structure.

Clause 117. The serving base station of clause 111, wherein when the number of symbols is 4 and the comb size is 8, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 118. The serving base station of clause 111, wherein when the number of symbols is 8 and the comb size is 4, the symbol group level indicates that 8 symbols are associated to produce a two symbol cyclic shift structure, 8 symbols are associated to produce a four symbol cyclic shift structure, or that 8 symbols are not associated to produce the cyclic shift structure.

Clause 119. The serving base station of clause 111, wherein when the number of symbols is 8 and the comb size is 8, the symbol group level indicates that 8 symbols are associated to produce a single-symbol cyclic shift structure, 8 symbols are associated to produce a two symbol cyclic shift structure, 8 symbols are associated to produce a four symbol cyclic shift structure, or that 8 symbols are not associated to produce the cyclic shift structure.

Clause 120. The serving base station of clause 111, wherein when the number of symbols is 12 and the comb size is 4 or 8, the symbol group level indicates that 12 symbols are associated to produce a three symbol cyclic shift structure, 12 symbols are associated to produce a six symbol cyclic shift structure, or that 12 symbols are not associated to produce the cyclic shift structure.

Clause 121. The serving base station of any of clauses 105-120, wherein the SRS received from the UE is for channel estimation.

Clause 122. The serving base station of any of clauses 105-121, further comprising: means for generating positioning measurements from the SRS received the UE; means for sending the positioning measurements to a network entity for position estimation of the UE.

Clause 123. A non-transitory computer-readable storage medium including program code stored thereon, the program code is operable to configure at least one processor in a serving base station for supporting wireless transmissions by a user equipment (UE) in a wireless network, the program code comprising instructions to: send a configuration for sounding reference signals (SRS) to the UE, the configuration for the SRS comprising a symbol group level indicating a number of symbols associated with a cyclic shift structure, and an outer code indicating a multiplier applied to the SRS at a symbol level; receive the SRS from the UE; and process the SRS received from the UE according to the configuration for the SRS comprising the symbol group level and the outer code.

Clause 124. The non-transitory computer-readable storage medium of clause 123, wherein the outer code increases multiplexing capacity by serving as an identifier for the UE relative to other UEs that transmit SRS using a same symbol group level, but with a different outer code.

Clause 125. The non-transitory computer-readable storage medium of any of clauses 123-124, wherein the outer code comprises a set or subset of orthogonal basis comprising one of a Fourier basis or a Hadamard basis.

Clause 126. The non-transitory computer-readable storage medium of any of clauses 123-125, wherein the configuration for the SRS further comprises an extended cyclic shift indicating a linear increase in phase rotation across tones in symbols associated with the symbol group level, wherein processing the SRS according to the configuration for the SRS further comprises the extended cyclic shift.

Clause 127. The non-transitory computer-readable storage medium of clause 126, wherein a combination of the extended cyclic shift and the outer code serves as an identifier for the UE.

Clause 128. The non-transitory computer-readable storage medium of any of clauses 126-127, wherein a common phase shift for at least a portion of the symbols associated with the symbol group level is included in the outer code.

Clause 129. The non-transitory computer-readable storage medium of any of clauses 126-128, wherein the configuration for the SRS further comprises a bandwidth and a comb size.

Clause 130. The non-transitory computer-readable storage medium of clause 129, wherein a maximum number of extended cyclic shifts is based on the number of symbols and the comb size, and the symbol group level.

Clause 131. The non-transitory computer-readable storage medium of clause 129, wherein the symbol group level is based on the number of symbols and the comb size.

Clause 132. The non-transitory computer-readable storage medium of clause 129, wherein when the number of symbols is 2, the symbol group level indicates that 2 symbols are associated to produce a single-symbol cyclic shift structure or that 2 symbols are not associated to produce the cyclic shift structure.

Clause 133. The non-transitory computer-readable storage medium of clause 129, wherein when the number of symbols is 4 and the comb size is 4, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 134. The non-transitory computer-readable storage medium of clause 129, wherein when the number of symbols is 4 and the comb size is 2, the symbol group level indicates that 4 symbols are associated to produce a two symbol cyclic shift structure, or that 4 symbols are not associated to produce the cyclic shift structure.

Clause 135. The non-transitory computer-readable storage medium of clause 129, wherein when the number of symbols is 4 and the comb size is 8, the symbol group level indicates that 4 symbols are associated to produce a single-symbol cyclic shift structure, or that 4 symbols are associated to produce a two symbol cyclic shift structure, or that 4 symbols are not associated to produce the cyclic shift structure.

Clause 136. The non-transitory computer-readable storage medium of clause 129, wherein when the number of symbols is 8 and the comb size is 4, the symbol group level indicates that 8 symbols are associated to produce a two symbol cyclic shift structure, 8 symbols are associated to produce a four symbol cyclic shift structure, or that 8 symbols are not associated to produce the cyclic shift structure.

Clause 137. The non-transitory computer-readable storage medium of clause 129, wherein when the number of symbols is 8 and the comb size is 8, the symbol group level indicates that 8 symbols are associated to produce a single-symbol cyclic shift structure, 8 symbols are associated to produce a two symbol cyclic shift structure, 8 symbols are associated to produce a four symbol cyclic shift structure, or that 8 symbols are not associated to produce the cyclic shift structure.

Clause 138. The non-transitory computer-readable storage medium of clause 129, wherein when the number of symbols is 12 and the comb size is 4 or 8, the symbol group level indicates that 12 symbols are associated to produce a three symbol cyclic shift structure, 12 symbols are associated to produce a six symbol cyclic shift structure, or that 12 symbols are not associated to produce the cyclic shift structure.

Clause 139. The non-transitory computer-readable storage medium of any of clauses 123-138, wherein the SRS received from the UE is for channel estimation.

Clause 140. The non-transitory computer-readable storage medium of any of clauses 123-139, wherein the program code further comprises instructions to: generate positioning measurements from the SRS received the UE; send the positioning measurements to a network entity for position estimation of the UE.

Therefore, it is intended that claimed subject matter not be limited to the particular examples disclosed, but that such claimed subject matter may also include all aspects falling within the scope of appended claims, and equivalents thereof.

What is claimed is:

1. A method performed by a user equipment (UE) for supporting wireless transmissions by the UE in a wireless network, the method comprising:
receiving a configuration for sounding reference signals (SRS) from a base station, the configuration for the SRS comprising a symbol group level indicating a number of symbols associated with a cyclic shift structure, and an outer code indicating a multiplier applied to the SRS at a symbol level;
preparing the SRS according to the configuration for the SRS comprising the symbol group level and the outer code; and
transmitting the SRS to one or more base stations.

2. The method of claim 1, wherein the outer code increases multiplexing capacity by serving as an identifier for the UE relative to other UEs that transmit SRS using a same symbol group level, but with a different outer code.

3. The method of claim 1, wherein the outer code comprises a set or subset of orthogonal basis comprising one of a Fourier basis or a Hadamard basis.

4. The method of claim 1, wherein the configuration for the SRS further comprises an extended cyclic shift indicating a linear increase in phase rotation across tones in symbols associated with the symbol group level, wherein preparing the SRS according to the configuration for the SRS further comprises the extended cyclic shift.

5. The method of claim 4, wherein the configuration for the SRS further comprises a bandwidth and a comb size.

6. The method of claim 5, wherein a maximum number of extended cyclic shifts is based on the number of symbols and the comb size, and the symbol group level.

7. The method of claim 1, wherein the SRS are transmitted to the one or more base stations for channel estimation or positioning.

8. A user equipment (UE) configured for supporting wireless transmissions by the UE in a wireless network, comprising:

a wireless transceiver configured to wirelessly communicate with entities in the wireless network;

at least one memory;

at least one processor coupled to the wireless transceiver and the at least one memory, wherein the at least one processor is configured to:

receive, via the wireless transceiver, a configuration for sounding reference signals (SRS) from a base station, the configuration for the SRS comprising a symbol group level indicating a number of symbols associated with a cyclic shift structure, and an outer code indicating a multiplier applied to the SRS at a symbol level;

prepare the SRS according to the configuration for the SRS comprising the symbol group level and the outer code; and transmit, via the wireless transceiver, the SRS to one or more base stations.

9. The UE of claim 8, wherein the outer code increases multiplexing capacity by serving as an identifier for the UE relative to other UEs that transmit SRS using a same symbol group level, but with a different outer code.

10. The UE of claim 8, wherein the outer code comprises a set or subset of orthogonal basis comprising one of a Fourier basis or a Hadamard basis.

11. The UE of claim 8, wherein the configuration for the SRS further comprises an extended cyclic shift indicating a linear increase in phase rotation across tones in symbols associated with the symbol group level, wherein preparing the SRS according to the configuration for the SRS further comprises the extended cyclic shift.

12. The UE of claim 11, wherein the configuration for the SRS further comprises a bandwidth and a comb size.

13. The UE of claim 12, wherein a maximum number of extended cyclic shifts is based on the number of symbols and the comb size, and the symbol group level.

14. The UE of claim 8, wherein the SRS are transmitted to the one or more base stations for channel estimation or positioning.

15. A method performed by a serving base station for supporting wireless transmissions by a user equipment (UE) in a wireless network, the method comprising:

sending a configuration for sounding reference signals (SRS) to the UE, the configuration for the SRS comprising a symbol group level indicating a number of symbols associated with a cyclic shift structure, and an outer code indicating a multiplier applied to the SRS at a symbol level;

receiving the SRS from the UE; and processing the SRS received from the UE according to the configuration for the SRS comprising the symbol group level and the outer code.

16. The method of claim 15, wherein the outer code increases multiplexing capacity by serving as an identifier for the UE relative to other UEs that transmit SRS using a same symbol group level, but with a different outer code.

17. The method of claim 15, wherein the outer code comprises a set or subset of orthogonal basis comprising one of a Fourier basis or a Hadamard basis.

18. The method of claim 15, wherein the configuration for the SRS further comprises an extended cyclic shift indicating a linear increase in phase rotation across tones in symbols associated with the symbol group level, wherein processing the SRS according to the configuration for the SRS further comprises the extended cyclic shift.

19. The method of claim 18, wherein the configuration for the SRS further comprises a bandwidth and a comb size.

20. The method of claim 19, wherein a maximum number of extended cyclic shifts is based on the number of symbols and the comb size, and the symbol group level.

21. The method of claim 15, wherein the SRS received from the UE is for channel estimation.

22. The method of claim 15, further comprising:

generating positioning measurements from the SRS received the UE;

sending the positioning measurements to a network entity for position estimation of the UE.

23. A base station configured for supporting wireless transmissions by a user equipment (UE) in a wireless network, the base station is a serving base station for the UE, comprising:

an external interface configured to wirelessly communicate with entities in the wireless network;

at least one memory;

at least one processor coupled to the external interface and the at least one memory, wherein the at least one processor is configured to:

send, via the external interface, a configuration for sounding reference signals (SRS) to the UE, the configuration for the SRS comprising a symbol group level indicating a number of symbols associated with a cyclic shift structure, and an outer code indicating a multiplier applied to the SRS at a symbol level;

receive, via the external interface, the SRS from the UE; and process the SRS received from the UE according to the configuration for the SRS comprising the symbol group level and the outer code.

24. The base station of claim 23, wherein the outer code increases multiplexing capacity by serving as an identifier for the UE relative to other UEs that transmit SRS using a same symbol group level, but with a different outer code.

25. The base station of claim 23, wherein the outer code comprises a set or subset of orthogonal basis comprising one of a Fourier basis or a Hadamard basis.

26. The base station of claim 23, wherein the configuration for the SRS further comprises an extended cyclic shift indicating a linear increase in phase rotation across tones in symbols associated with the symbol group level, wherein processing the SRS according to the configuration for the SRS further comprises the extended cyclic shift.

27. The base station of claim 26, wherein the configuration for the SRS further comprises a bandwidth and a comb size.

28. The base station of claim 27, wherein a maximum number of extended cyclic shifts is based on the number of symbols and the comb size, and the symbol group level.

29. The base station of claim 23, wherein the SRS received from the UE is for channel estimation.

30. The base station of claim 23, wherein the at least one processor is further configured to:

generate positioning measurements from the SRS received the UE;

send, via the external interface, the positioning measurements to a network entity for position estimation of the UE.

* * * * *